United States Patent
Diaz et al.

(10) Patent No.: US 10,031,500 B1
(45) Date of Patent: Jul. 24, 2018

(54) DEVICE AND SYSTEM INCLUDING MULTIPLE DEVICES FOR SUPERVISION AND CONTROL OF MACHINES IN INDUSTRIAL INSTALLATION

(71) Applicant: PLETHORA IIoT, S.L., Elgoibar, Guipuzcoa (ES)

(72) Inventors: Javier Diaz, Guipuzcoa (ES); Jose Juan Gabilondo, Guipuzcoa (ES)

(73) Assignee: PLETHORA IIoT, S.L., Elgoibar (Guipuzcoa) (ES)

( * ) Notice: Subject to any disclaimer, the term of this patent is extended or adjusted under 35 U.S.C. 154(b) by 0 days.

(21) Appl. No.: 15/630,716

(22) Filed: Jun. 22, 2017

Related U.S. Application Data

(63) Continuation of application No. 15/446,823, filed on Mar. 1, 2017.

(51) Int. Cl.
  G05B 15/02 (2006.01)
  G05B 19/042 (2006.01)
  G05B 19/414 (2006.01)

(52) U.S. Cl.
  CPC ......... *G05B 19/042* (2013.01); *G05B 19/414* (2013.01); *G05B 2219/24216* (2013.01)

(58) Field of Classification Search
  CPC ................ G05B 19/042; G05B 19/414; G05B 2219/24216
  USPC ............................................................. 700/9
  See application file for complete search history.

(56) References Cited

U.S. PATENT DOCUMENTS

| | | | |
|---|---|---|---|
| 6,330,583 B1 | 12/2001 | Reiffin | |
| 7,555,566 B2 | 6/2009 | Blumrich et al. | |
| 8,667,123 B2 * | 3/2014 | Orton | H04L 12/40 370/242 |
| 9,568,909 B2 * | 2/2017 | Lawson | G05B 19/4185 |
| 9,655,217 B2 * | 5/2017 | Recker | H05B 37/0272 |
| 2004/0103218 A1 | 5/2004 | Blumrich et al. | |

(Continued)

FOREIGN PATENT DOCUMENTS

| | | |
|---|---|---|
| BR | 102013018787 | 11/2015 |
| CN | 200950596 | 9/2007 |

(Continued)

OTHER PUBLICATIONS

European Search Report for Patent Application No. 17382107.5, dated Jul. 11, 2017 (16 pages).

(Continued)

*Primary Examiner* — Ziaul Karim

(57) ABSTRACT

A system and device for supervising and controlling operation of at least one machine of an industrial installation. A server and a plurality of devices form a computing cluster. At least some devices of the plurality of devices are connected to a machine of the industrial installation. Each device has a first processor to compute in real-time, using data acquired from the machine, a first processing task for solving a first query; and a second processor sharing its processing power with the network, and computing, when assigned by the server, at least one thread of a second processing task for solving a second query. The server controls the computing cluster, partitions the second processing task into a plurality of threads, and assigns one or more threads of the plurality of threads to the second processor of some of the devices of the plurality of devices.

12 Claims, 12 Drawing Sheets

(56) References Cited

U.S. PATENT DOCUMENTS

| | | |
|---|---|---|
| 2005/0235092 A1 | 10/2005 | Ballew et al. |
| 2005/0256969 A1 | 11/2005 | Yancey et al. |
| 2006/0179487 A1 | 8/2006 | Hatakeyama |
| 2007/0206603 A1 | 9/2007 | Weich et al. |
| 2008/0208361 A1 | 8/2008 | Grgic |
| 2010/0125437 A1 | 5/2010 | Vasseur et al. |
| 2011/0041136 A1 | 2/2011 | Messier et al. |
| 2012/0026898 A1 | 2/2012 | Sen et al. |
| 2012/0310423 A1 | 12/2012 | Taft |
| 2013/0090906 A1 | 4/2013 | AlShaikh et al. |
| 2013/0226764 A1 | 8/2013 | Battyani |
| 2013/0318240 A1 | 11/2013 | Hebert et al. |
| 2013/0338841 A1 | 12/2013 | Scholtz et al. |
| 2014/0047064 A1 | 2/2014 | Maturana et al. |
| 2014/0215141 A1 | 7/2014 | Leon |
| 2015/0186775 A1 | 7/2015 | Cruz Mota et al. |
| 2015/0263900 A1 | 9/2015 | Polyakov et al. |
| 2015/0316911 A1* | 11/2015 | Rischar ................. G05B 15/02 700/9 |
| 2016/0067864 A1 | 3/2016 | Mullan et al. |
| 2016/0087848 A1 | 3/2016 | Heinz et al. |
| 2016/0276831 A1* | 9/2016 | Karlak ..................... H02J 3/00 |
| 2016/0291581 A1 | 10/2016 | Eguchi et al. |
| 2016/0350157 A1* | 12/2016 | Necas .................. G06F 9/5038 |
| 2017/0230462 A1 | 8/2017 | Ascheid et al. |
| 2017/0286118 A1* | 10/2017 | Coleman ............... G06F 9/3802 |

FOREIGN PATENT DOCUMENTS

| | | |
|---|---|---|
| CN | 201196659 | 2/2009 |
| CN | 101667169 | 3/2010 |
| CN | 101739011 | 6/2010 |
| CN | 102594627 | 7/2012 |
| CN | 202711036 | 1/2013 |
| CN | 102932276 | 2/2013 |
| CN | 204009683 | 12/2014 |
| CN | 104808108 | 7/2015 |
| WO | WO04090734 | 10/2004 |

OTHER PUBLICATIONS

Dall et al.; "*KVM/ARM: Experiences Building the Linux ARM 1 Hypervisor*"; Department of Computer Science, Columbia University, Apr. 2013 (19 pages).

Firdhous et al.; "*Fog Computing: Will it be the Future of Cloud Computing?*"; Proceedings of the Third International Conference on Informatics & Applications, Kuala Terengganu, Malaysia, 2014 (8 pages).

Pranali More; "*Review of Implementing Fog Computing*"; IJRET: International Journal of Research in Engineering and Technology, vol. 04, Issue 06, Jun. 2015 (4 pages).

Randy Bias; "*Grid, Cloud, HPC . . . What's the Diff?*"; http://cloudscaling.com/blog/cloud-computing/grid-cloud-hpe-whats-the-diff/, posted Nov. 18, 2010 (6 pages).

Astarloa et al.; "*1588-aware High-Availability Cyber-Physical Production Systems*"; IEEE, 2015 (6 pages).

Steiner et al.; "*Fog computing as enabler for the Industrial Internet of Things*"; Elektrotechnik & Informationstechnik, 2016 (5 pages).

MPI: A Message-Passing Interface Standard Version 3.1; Message Passing Interface Forum, Jun. 4, 2015 (868 pages).

\* cited by examiner

DEVICE AND SYSTEM INCLUDING MULTIPLE DEVICES FOR SUPERVISION AND CONTROL OF MACHINES IN INDUSTRIAL INSTALLATION

CROSS-REFERENCE TO RELATED APPLICATION

This application is a continuation of U.S. application Ser. No. 15/446,823, filed Mar. 1, 2014 for "DEVICE AND SYSTEM INCLUDING MULTIPLE DEVICES FOR SUPERVISION AND CONTROL OF MACHINES IN INDUSTRIAL INSTALLATION", which is hereby incorporated by reference herein.

TECHNICAL FIELD

The present invention relates to the field of devices for supervision and control in industrial installations. More particularly, it relates to high-availability devices for capturing and processing data in real time in industrial environments generating large amounts of data. These devices may be particularly advantageous for implementing smart services, such as energetic efficiency and predictive maintenance in industrial machinery. The present invention also relates to networks, systems and industrial installation including these devices.

STATE OF THE ART

In the nineties (1990's) the concept of a network made of smart devices was developed and a term defining such concept was coined: the "Internet of Things (IoT)". The IoT refers to physical objects or devices which may be connectable to the Internet and are able to identify themselves to other objects or devices with the so-called machine-to-machine or M2M communications. The IoT can be defined as the network of physical objects embedded with electronics, software, sensors and network connectivity that enables these objects to collect and exchange data. The objects belonging to the IoT can be sensed and controlled remotely across existing network infrastructure. Each "Thing" is uniquely identifiable through its embedded computing system and may be able to be operated with by means of the existing Internet infrastructure. Currently, the IoT brings together multiple technologies, encompassing both wireless and wired communications and networks, sensors and both embedded systems and micro-electromechanical systems (MEMS). The IoT is applicable to many different environments, including home (smart homes), public infrastructures (such as smart cities, including for example environmental supervision), and industry (either in the specific sense of industry, such as smart grids, or in the broad sense of industry, embracing some public infrastructures, such as intelligent transportation).

When the IoT is applied to industrial infrastructures (in its broadest sense), the specific term Industrial Internet of Things (IIoT), also referred to as Industry 4.0, is used. When industrial equipment is integrated in the IIoT, machines are capable of informing about their working state to upper level supervision systems, thus enabling predictive smart services, such as quality control in real time (RT), as named by Acatech (National Academy of Science and Engineering), Smart Service Welt, March 2014. This will in turn enable manufacturers of industrial equipment to become providers of advanced services.

The main difference between IIoT and IoT is that the devices and machines embracing IIoT may be (or be part of) systems whose failure or malfunction may result in at least one of loss or severe damage to equipment/property, environmental harm, and/or severe productive loss, among others. In this sense, the systems of an industrial installation demand solutions featuring real-time response and synchronization between different machines so that they are actuated when there is any potential malfunction that may lead to any of the previous events. Non-limiting examples of such systems are power generation plants such as nuclear power plants, electrical power transmission and transportation, oil refineries, natural gas processing plants, chemical treatment plants, and manufacturing production and assembly lines.

Referring in particular to the example of manufacturing production lines, an exemplary malfunction leading to a critical event may be the failure of a ball in one of the many bearings comprised in a machine used in a machining process. The machine may comprise a great deal of elements and/or mechanical assemblies of high complexity, however the failure of the ball (i.e. damaged ball) in one bearing may render the machine inoperative thereby causing the interruption of the whole production line. In this sense, a single worn ball may trigger a chain of events that end up ruining the whole machine. In some other cases, the machine is still operative even after the ball has been damaged but, in contrast, this event leads to the failure of further elements within the same machine that may eventually break the machine. In these situations, the time it takes from the exact moment when the component (e.g. ball) fails until the instruction to stop the machine is given and effected is the most critical aspect in avoiding failures or even disasters. Another example of a critical event in the field of machining processes is the breaking of a single cutting edge of a tool (or even the same damaged ball), which may cause severe quality problems and involve production losses: the goods processed by the machine are incorrectly processed and, therefore, they become defective and do not meet the minimum quality requirements; it may occur that nobody detects that the goods are defective, or that they are detected but well after they have been delivered to the distributors or end customers. Therefore, such faults must be detected in real time, so prompt detection of and reaction to (depending on the nature of the machine and the fault, this may be few milliseconds) the failure of components is a must in industrial environments. Further, it is preferable that industrial systems may somehow predict when the components within machines are about to fail so that they may be replaced prior to their failure.

When machines of industrial installations embrace IIoT, these tend to generate large amounts of data (a single machine may include tens, hundreds or even thousands of sensors), thus creating new challenging business opportunities. Such amounts of data bring the consequent necessity for quick processing time of the data, and an increase in the need to quickly index, store, and process such data since, otherwise, the data generated may become meaningless. By way of example, a machine tool that may output thousands of variables, that is, thousands of different pieces of potential information provided by sensors and/or devices controlling the operation of the machine tool, may be halted prior to failure or few instants after the failure has occurred if those variables (or a subset of those variables) are processed fast and a meaning is extracted from the combination of some or all of them. Considering the particular case of a machine tool having 3 servomotors and a machining spindle, the amount of output variables is 78. If the throughput per sample is 2.8

MB/cycle, the amount of data captured per year is roughly 1 TB. The delay in the processing of the variables and in the reacting upon the subsequent extraction of knowledge from the variables determines whether the failure is effectively prevented or not, in which case it determines what the cost will be of the failure having occurred. As described in the examples above, the later the failure is detected the higher the costs that will be incurred in solving the resulting problems.

The current approach for dealing with large amounts of data is based on a pyramidal computation stack 190, as depicted in FIG. 1. In a first level, sensors continuously capture data from a device or machine of an industrial installation (critical system, in general) under supervision/quality control. A second level is the local control level, implemented for example with PLCs (Programmable Logic Controllers) or Computer Numerical Control (CNC) tools, wherein sensor signals are converted to digital data. Data acquired from the sensors are communicated to an Industrial Control System (ICS), such as SCADA (Supervisory Control And Data Acquisition), via the PLC/CNC level. SCADA is a centralized computer-based system for remote monitoring and control of industrial processes (which may also be spread out over large areas), such as manufacturing, power generation, infrastructure processes, electrical power transmission and transportation, among others. Local control actions are performed by the PLC/CNC, while SCADA is in charge of global control actions affecting the whole system.

The SCADA layer deals with information, while the lower layer (PLC/CNC) directly deals with data. In this context, the term "data" refers to raw values (such as a voltage value or others) as provided by their corresponding source (e.g. sensor, PLC/CNC, or device in general), while the term "information" also refers to data but in a contextualized form. For instance, the voltage resulting from a thermistor is data (particularly raw data), and the voltage once it is given a meaning (i.e. what is the temperature for that particular voltage) is also information.

The upper levels of the pyramid are MES (Manufacturing Execution System) and ERP (Enterprise Resource Planning). MES are computerized systems in charge of management of product definitions, management of resources, scheduling, dispatching and executing production orders, collecting production data, and performing analysis on production, among others, whereas ERP refers to business-management software which provides an integrated view of core business processes. It is used for example to collect, store, manage and interpret data from different business activities, such as product planning, marketing and sales, inventory management and shipping and paying. The upper layers (MES and ERP) do not deal with information as such any more, but rather work with business-related information (also referred to as "knowledge") which may be extracted from the information as such once it has been processed.

The SCADA systems of the prior-art have to manage low amounts of information that reflect the current status of the supervised machines (e.g. active/inactive devices in general, open/closed states of valves, level of pressure in tanks, etc.); these status values may be retrievable from a PLC/CNC for example. When tasks other than mere supervision are intended (for instance performing predictive maintenance or assessing whether a device or machine is operating correctly despite an apparent correct overall performance), it is necessary to take into account all or most of the data provided by the sensors and related devices of the industrial machine. A single machine may include hundreds or even thousands of sensors, each of which may provide more than one variable (e.g. a photo of a digital camera has as many variables as pixels the photo features). Accordingly, a large amount of data (i.e. data, which may then provide information and knowledge) is provided. In the prior-art, the data have to be stored in the cloud where it may be processed by means of the so-called cloud computing. Cloud computing is a model that enables ubiquitous, on-demand network access usually over the Internet to a shared pool of configurable computing/processing resources, such as servers, networks and databases. Due to the nature of the Internet, issues such as network latency, security and privacy are inherent to cloud systems. In general, security and privacy are problematic issues when sensitive information and data are stored in the cloud.

But even if these two issues were not to be a problem, cloud computing cannot give proper response to the demanding conditions of controlling industrial environments. First of all, the mere storing of the data is generally not feasible at all: large throughputs of data are produced by each machine of an industrial installation, thus the bandwidth necessary to transfer the data to the cloud is generally insufficient; further, the system is not only limited by the communication channel, but also by all the devices which make possible transmitting the data to the cloud, for instance switches, routers, etc. This is especially problematic in systems like the ones exemplified above, which must be controlled in response to an anomalous behavior that may only be detected using the raw data provided by the machine itself, and carrying out the detection in an extremely short period of time. And secondly, because in order to detect such an anomalous behavior, it would be necessary to process all the data stored, and despite the computation capabilities of cloud computing this may not be sufficient to provide a response, much less in short periods of time.

In order to alleviate these drawbacks, a new paradigm commonly referred to as fog computing or edge computing has been developed intending to bring the cloud closer to the industrial installation. Fog/edge computing extends the cloud computing to the physical location of the machines belonging to the network, assuring proximity to end-users and local resource pooling, thus reducing network latency, as reported for example by Pranali More in "Review of implementing Fog computing", IJT: International Journal of Research in Engineering and Technology, Vol. 04, Issue 06, June 2015. Fog/edge computing addresses some of the security and privacy problems or concerns associated with cloud computing insofar as data or information may not have to be stored in the cloud. Nevertheless, fog/edge computing requires deploying a large infrastructure that may be extremely expensive and which, anyway, does not solve all the problems of cloud computing. Particularly, the same bandwidth and computing issues are also present in fog/edge computing. Now it is true that the network latency may be lower than for cloud computing, yet the bandwidth of the communication channel may prove not sufficient for the throughputs generated in an industrial installation. If the network could somehow cope with the amount of data generated by the entire industrial installation, again this amount of data would have to be processed in time so as to detect any anomalous behavior of the machines.

By way of example, FIG. 2 shows a scheme of the nowadays architecture connecting the industrial networks and the cloud. As a matter of an example, four endpoints are shown, each of them representing a different example of industrial networks: a wind turbine farm, a locomotive, a machine tool and a cell for inserting components into a workpiece using a robot. Each endpoint is connected to a Cyber-Physical Production System (CPPS) in charge of capturing data from the endpoints and performing a local pre-processing of the captured data. Examples of pre-processing performed by conventional CPPSs are eliminating erroneous data for space saving and simple sample transformations (signal processing applying for example mean values, median values, standard deviations, changes of domain like, for example, from time-domain to frequency-domain with Fast Fourier Transforms, FFT). Secured communication is provided between the CPPS and the cloud, in order to send the pre-processed data to the cloud for further storage and processing. In many applications, it is required that several CPPSs are connected to each other, for example over an Ethernet network. There are currently several companies offering devices working as the illustrated CPPS and capable of connecting to neighbor devices. Examples of such devices are $^{DE}$Switch Akro 6/0 TSN developed by TTTech, CPPS-Gate40 developed by SoCe, and eWON Flexy developed by eWON.

Armando Astarloa et. al. have proposed a CPPS featuring the IEEE 1588 high availability protocol, composed by smart nodes able to capture and process multi-sensor data, and the nodes being in a high-availability ring network able to support sub-microsecond synchronization ("1588-aware High-Availability Cyber-Physical Production Systems," *Precision Clock Synchronization for Measurement, Control, and Communication (ISPCS)*, 2015 IEEE International Symposium on, Beijing, 2015, pp. 25-30). The network fulfills extremely demanding synchronization requirements. Each smart node sends a huge amount of sensor data combined with their timestamping values to a server in the cloud, where they are to be processed and managed.

The problem of such system is that the amount of data generated within each smart node (CPPS) may cause the communications link between smart nodes and the server to be unable to perform as expected. Referring again to the example of an industrial machine represented by thousands of variables per second (samples per sub-millisecond), even after preprocessing the data associated with those variables in a CPPS, the server may be unable to process that data within the demanding time premises of industrial environments, thus rendering certain smart services, such as services for improving overall equipment efficiency and predictive maintenance, unattainable.

This problem might be tackled by deploying a vast infrastructure of communications channels and switches providing enough capacity to deal with the enormous amount of data to be delivered to the cloud (including data obtainable from sensors, as depicted in FIG. 1), and by ensuring short times for processing the data and extracting knowledge from the data (this means that enough computational resources must always be available and that the network latency is low and stable). However, in addition to the required large economical investment in equipment and maintenance, this is only a short-term solution which is not even cost-effective since the requirements in channel bandwidth and processing power grow continuously as new industrial machines are added up to the industrial installation, therefore the system is not scalable.

DESCRIPTION OF THE INVENTION

The device, network and system described in the present disclosure intend to solve the shortcomings of prior-art smart devices and networks thereof. The device, network and system are a device, network and system for supervising operation of at least one machine in an industrial installation. The device, network and system of the invention may also predict the behavior of the at least one machine or actuate the at least one machine, for example by providing an instruction or command to the at least one machine or a component thereof in order to react to any malfunction that might have been detected or diagnosed. Each of the device, network and system are particularly applicable for use in industrial environments demanding smart services, such as services for improving overall equipment efficiency and predictive maintenance, in a cost-effective manner as will be apparent from the present description.

In the context of the present disclosure, the expression "supervising operation" should be interpreted broadly, encompassing not only passive surveillance of the one or more machines in an industrial installation, but also active reaction, actuation, prediction, prescription, control or management on the one or more machines.

In the context of the present disclosure, the term "machine" refers to any machine, machinery, station, cell, component or peripheral equipment connected to a machine, machinery, station or cell of an industrial environment. In this text, the term "sensor" is intended to encompass not only sensors in a literal sense but also equipment for integrating a plurality of sensors, such as PLC and CNC providing any data that may be outputted by these machines, including sensor data that may have been captured by the equipment for integration of sensors. In other words, "sensors" belong to a stage of field data acquisition and encompass any field data acquisition means. In the context of the present disclosure, the term "data" refers to raw values (such as a voltage value or others) as provided by their corresponding source (e.g. sensor, PLC/CNC, or device in general), while the term "information" also refers to data but in a contextualized form. For instance, the voltage resulting from a thermistor is data (particularly raw data), and the voltage once it is given a meaning (i.e. what is the temperature for that particular voltage) is also information. Obviously, the term "data" also encompasses a sample or a set of samples obtainable from sensors when referring to digitized pieces of information, in the form of bits or bytes for example.

A first aspect of the invention relates to a device for supervising operation of at least one machine of an industrial installation or for supervising such operation and actuating the at least one machine based on such supervision. The device comprises a first processor configured to compute a first processing task in real-time with data acquirable from a machine to which the device is connectable, the first processing task being for solving a first query. The device further comprises a second processor configured to share its processing power with a network to which the device is connectable, and to compute at least one thread of a second processing task when assigned by another device (referred to as server or master in the present disclosure) of the network, the second processing task being for solving a second query.

The device is capable of solving queries related to the operation of the at least one machine or at least one component thereof. In preferred embodiments, the machine to which the device is connectable is the at least one device. The network to which the device is connectable is preferably a computing cluster network in a high performance computing context.

A second aspect of the invention relates to a system for supervising operation of at least one machine of an industrial installation or for supervising such operation and actuating the at least one machine based on such supervision. The system comprises a network in turn comprising a server and a plurality of devices forming a computing cluster. At least some devices of the plurality of devices are devices according to the first aspect of the invention. In this sense, each device of the at least some devices of the plurality of devices is connectable to a machine of the industrial installation and comprises: a first processor configured to compute a first processing task in real-time with data acquirable from the machine to which the device is connectable, the first processing task being for solving a first query; and a second processor configured to share its processing power with the network, and to compute at least one thread of a second processing task when assigned by the server, the second processing task being for solving a second query. The server of the network is configured to control the computing cluster, to partition the second processing task in a plurality of threads; and to assign at least one thread to the second processor of at least some devices of the plurality of devices. In this regard, the server comprises a processor configured to manage the computing cluster, to partition the second processing task in a plurality of threads, and to assign and transmit at least one thread to the second processor of at least some devices of the plurality of devices. The processor comprised in the server may also be configured to receive outputs to the threads from the at least some devices of the plurality of devices; process the outputs of the threads to compute the second processing task; and provide a solution to the second query.

A third aspect of the invention relates to an industrial installation comprising: a plurality of machines; and a network for supervising operation of at least one machine of the plurality of machines or for supervising such operation and actuating the at least one machine based on such supervision, the network comprising a server and a plurality of devices forming a computing cluster. At least some devices of the plurality of devices are connectable to a machine of the plurality of machines, each device of the at least some devices comprising: a first processor configured to compute, in real-time with data acquirable from the machine to which the device is connectable, a first processing task for solving a first query; and a second processor configured to share its processing power with the network, and to compute, when assigned by the server, at least one thread of a second processing task for solving a second query. The server of the network is configured to control the computing cluster; partition the second processing task into a plurality of threads; and assign one or more threads of the plurality of threads to the second processor of at least some devices of the plurality of devices. The server may also be configured to receive outputs of the threads from the at least some devices of the plurality of devices; process the outputs of the threads to compute the second processing task; and provide a solution to the second query.

In preferred embodiments, the at least some devices comprise each device of the plurality of devices. Further, in some of these preferred embodiments, each device of the plurality of devices of the network (of the system or the industrial installation) is a device according to the first aspect of the invention.

The device may solve queries in real time while obtaining data from the machine in real time, something which in turn enables reacting in real time or near real time, for instance for preventing a critical event from happening or preventing that a critical event that has already occurred may produce damage to the industrial installation or operators within the industrial installation; in this sense, the device may derive from such queries an instruction for the machine (e.g. adjusting parameters of a component, turning off the machine, etc.). The device may also be integrated within a computing cluster network so as to contribute towards solving queries that, due to their complexity or computational burden, may not be solved in real time but that, owing to the computing cluster network, may be solved in in-process time, i.e. while an industrial process is taking place (a process of a machine of the industrial installation), thereby enabling in-process reaction. The queries may be queries for supervising operation of at least one machine (or at least one component of a machine) in an industrial installation, or queries for predicting the behavior of the at least one machine/component or for actuating the at least one machine/component, or queries whose answer is used by the device or by the server controlling the devices for reacting to any malfunction that might have been detected or diagnosed or for actuating on the machine/component or for prescribing any actuation on the machine/component. Further, since data from the industrial installation may be stored within the computing cluster network, the device may also contribute towards solving queries that do not require a solution in real time or in-process time, but which may provide information of degradation, possible failures or potential improvements to be performed in a certain time horizon.

In the context of the present disclosure, the term "real time" refers to a time comprised within a range varying between a minimum value $V_{min}$ and an upper value of 100 ms (milliseconds), such as a range varying between a minimum value $V_{min}$ and an upper value of 50 ms, a range varying between a minimum value $V_{min}$ and an upper value of 5 ms, or a range varying between a minimum value $V_{min}$ and an upper value of 1 ms. Taking into account current technology, the minimum value $V_{min}$ may be, for example but without limitation, 1 µs (microseconds). Nevertheless, one skilled in the art will understand that the evolution of technology may enable to reduce the minimum value $V_{min}$ of the range to a minimum value smaller than 1 µs, such as a minimum value of 500 ns, a minimum value of 100 ns, a minimum value of 20 ns or a minimum value of 1 ns.

In the context of the present disclosure, queries that may be solved in real time by a single device (preferably the device obtaining the required data for solving the queries from the machine connectable thereto) are referred to as first queries, whereas queries that may be solved in in-process time are referred to as second queries.

Second queries have a task associated therewith that may be parallelized by partitioning it into one or more parts (i.e. threads), meaning that one or more threads of the task for solving the second query may be provided and assigned to different devices of a computing cluster network. Each of these threads may be computed in a distributed manner (e.g. in different devices). When a second processor of a device computes a thread, the result of the thread may be integrated with other threads (for example at a device or at the server of the computing cluster network) of the same task so that the query may be solved. The time it takes to solve a query by parallelizing the computing of its task may be shorter than solving it without any parallelization.

The second processor of the device is configured to compute at least one thread of a second processing task when the server (of a network that the device is connectable and/or connected to) assigns such thread to the device. The assignation of threads by the server is done taking into account the available computational capacity of the devices forming the network. Since the second processor contributes towards the solving of a second query by computing a part of the corresponding second processing task, the second processor is configured to share its processing power with the computing cluster network to which the device is connectable and/or to which the device is connected to. If the computing cluster network has, for instance, nodes in the form of the device of the first aspect of the invention, the processing power of the second processor may be shared with the second processors of alike devices within the computing cluster network. Even though the computing cluster network preferably comprises as many nodes as there are devices and a server, the computing cluster network may comprise further nodes in the form of, for example but without limitation, Ethernet switches, routers, data storage devices, devices with processing power not shared with the computing cluster network, etc.

The integration in the same device of multi-sensor data acquisition and local processing capabilities (in the first processor) and distributed processing capabilities (in the second processor) gives rise to a new concept of pyramidal computation for high-availability data processing that replaces the traditional pyramid: While large amount of business decisions (knowledge) may keep on being stored and processed in the cloud and/or certain information (e.g. as the result of processing raw data as collected from machinery interfaces in order to generate a global view of the industrial installation under quality control) may keep on being stored and processed in the fog/edge, a new computational layer has been developed and defined: the ground computing.

Regarding the server of the system, it further includes means for connecting to the network (for example an input/output port or a network interface controller) through which the server is connectable and/or connected to the network. The server and the processor thereof may be further configured to optimize the performance of the computing cluster by balancing the load of the devices within the computing cluster. In this sense, each device may transmit information regarding its computational load to the server such that the processor of the server may know the computational load of each device and, thus, assign any threads to the devices depending on the computational load thereof. The computational capabilities of the computing cluster are thus optimized, because it might happen that some devices are almost idle while others are running tasks close to their computational capacity. The processing or computational capacity of the network increases when additional devices are incorporated into the network as new devices and machines are deployed in the industrial installation. This in turn may enable solving more complex queries because data need not be taken out of the network (the data remain in the ground level).

The device and the system of the present disclosure may provide a new computational scheme formed by a local computational level in which sensor data (understanding sensors in the broad sense already specified, and data as embracing samples) is first obtained and then used for locally solving one or more first queries, and a distributed computational level in which there is a distributed solving of one or more second queries. This new computational scheme may reduce the response time to any query and the reaction time to solve (and to derive an instruction from) a query within the industrial installation that the network is associated with. In other words, the devices and the distributed computing (regarded as high performance computing, i.e. HPC) performed by the devices working in the computing cluster network increase the overall computational performance derived from the predictive control/supervision applied to the industrial installation. Accordingly, a new computational layer is added to the current pyramidal computational stack 190 of FIG. 1. This new computational layer is referred to as ground computing and encompasses the processing of the second processor of each device in the network. In other words, ground computing includes the high performance computing performed by the devices included in the network to solve second queries within the ground computing layer. Ground computing layer is built on top of the lowest layer, hereinafter referred to as liquid computing layer, which encompasses the processing of the first processor of each device in the network. The liquid computing layer computes tasks for solving the first queries in real-time with data that may be obtained from the machine the device is connectable to. In order to fulfil the requirement of solving the first queries in real-time, a first processor having programmable hardware/electronics may be advantageously used. For example, but without limitation, a field programmable integrated circuit such as an FPGA (i.e. field-programmable gate array), as hardware accelerator, may be used. This enables the computation of tasks associated with first queries in processing cycle times, such as between 1/1.5 GHz and 1/0.8 GHz, that is to say, between 0.67 ns (nanoseconds) and 1.25 ns. Thus, supervision of a machine or of a component thereof may be achieved in Real Time.

Besides, because large amounts of data produced in complex industrial installations are processed within the computing cluster (that is closer to the machine than cloud/fog computing) in two different layers (liquid computing, solving queries that require real time processing and therefore enable reaction to an event in near real time, e.g. in the order of milliseconds; and ground computing, solving queries that without parallel computing would be solved in a time insufficient for quick reaction, and also in some cases, if necessary, solving queries with less-demanding time responses, enabling an in-process reaction, that is, during the time it takes to carry out a process), the amount of data delivered to equipment performing edge/fog/cloud computing (to be treated offline for an off-process reaction, that is, in a time longer than the time it takes to carry out a process) may be reduced. In fact, there is no need for raw data being transmitted to the cloud/fog/edge for processing, therefore the telecommunications infrastructure between the different layers may have a lower capacity and/or higher latency. On the contrary, substantially only contextualized information leaves the computing cluster (ground computing) for further processing or computation in the edge/fog/cloud. The new computational scheme described may therefore coexist with existing paradigms, such as cloud computing and fog/edge computing, but these ones are dedicated to refined processing (that is, advanced treatment of information in order to gain knowledge of the industrial system under analysis).

In some embodiments of the invention, the first processing task includes: preprocessing the first data to form a data set for solving the first query. That is, the first processor of the device is further configured to preprocess the first data to form a data set for solving the first query. In some embodiments of the invention, the first processing task includes: preprocessing the first data to form a data set; and selecting a subset of data, from the data set, for solving the first query. That is, the first processor of the device is further configured to preprocess the first data to form a data set, and to select a subset of data, from the data set, for solving the first query.

The device obtains the necessary data (generally sensor data), preprocesses the obtained data thereby reducing the size of the data, and solves queries using the preprocessed data (that is, the data with reduced-size). Further, a part or a totality of the preprocessed data may also be delivered to fog/cloud computing equipment such that, with fog and/or cloud computing, further processing may be provided for business-related queries or operations for example.

In some embodiments of the invention, the second processor of the device is further configured to locally compute a third processing task for solving a query (a query not linked to parallel computing, which is also referred to as third queries in the present disclosure), that is, the second processor is not limited to solving tasks related to a second query of parallelizable nature.

In some of these embodiments, the third processing task includes processing the data obtainable from any device of the network (including the server or the same device) to form a data set for solving the query (not linked to parallel computing, i.e. third query); that is, the second processor of the device may be further configured to process the data obtainable from any device of the network to form a data set for solving the query not linked to parallel computing.

In some embodiments of the invention, the first processor of the device is further configured to derive an instruction after solving the first query. The first processor of the device is further configured to transmit the instruction to either the machine connectable to the device, the network, or a machine connectable to another device of the plurality of devices (of the network). In some cases, the first processor may first transmit the instruction to the second processor, which in turn is further configured to transmit the instruction to the machine connectable to the device and/or to another device of the plurality of devices.

In some embodiments of the invention, the second processor of the device is further configured to provide a solution to the first query receivable from the first processor of a same device to the network or the server thereof.

In some embodiments of the invention, the device further includes a data storage device including at least a non-volatile memory, such as a hard disk drive (HDD) or preferably a solid-state drive (SSD). The second processor of the device may store data in and retrieve data from the non-volatile memory; by way of example, the second processor may buffer any data that have to be transmitted to the network when the communications channel has no free bandwidth available, and may buffer any data that are received from the network prior to processing the data.

In some embodiments of the invention, the server of the system comprises or is connected to a data storage device including at least a non-volatile memory. In these embodiments, any data produced within the devices of the network may be stored in the non-volatile memory of the server.

In some embodiments of the invention, each device of the network is configured to perform data acquisition (from the machine to which the device is connectable) synchronized with the data acquisition performed by other devices of the plurality of devices (from the machine each of the other devices is connectable to). In order to work synchronously, each device of the network implements a protocol (for example in the second processor, or in means for connecting to a network) for synchronizing clocks throughout the network and for the simultaneous acquisition of data in order for each device to acquire data from a machine at the same instant as other devices of the network. For example, this protocol may be Precision Time Protocol (PTP) (IEEE 1588), White Rabbit, or Time Sensitive Network (TSN). In particular embodiments, each device includes a synchronized timer for synchronizing, preferably with sub-microsecond precision, with the server and with other devices in the network.

In some embodiments of the invention, the server includes a first processor and a second processor. In some embodiments, the server is a device according to the first aspect of the invention.

In some embodiments, the server includes a processor configured to run a first instruction set architecture different from a second instruction set architecture run by the second processor of each device of at least some devices or all devices of the plurality of devices. The server further includes a network interface connectable to the network (for example to a device within the computing cluster), the network interface being configured to convert instructions from the first instruction set architecture to the second instruction set architecture and vice versa. The network interface permits that the plurality of devices of the network runs an instruction set architecture that is different from the instruction set architecture of the server; this is advantageous since the server may be interconnected with other equipment (e.g. equipment for fog computing and/or cloud computing) running an (ubiquitous) instruction set architecture such as x86. Therefore, irrespective of the instruction set architecture run in the network, the server may communicate any data generated within the network to other devices outside of the network by converting (with the network interface) the instructions to the corresponding instruction set architecture. Non-limiting examples of possible instruction set architectures are ARM, Arduino, Raspberry PI, x86, PowerPC, SoC devices etc.

In some embodiments of the invention, the first processor of the device includes one of: a central processing unit or at least one core thereof, a graphics processing unit, a field-programmable integrated circuit such as an FPGA (i.e. field-programmable gate array), as hardware accelerator, or an embedded circuit (e.g. a system-on-chip, a multiprocessor system-on-chip)—e.g. Zynq, MPSoC by Xilinx—, and a combination thereof. In some embodiments of the invention, the second processor of the device includes one of: a central processing unit or at least one core thereof, a graphics processing unit, a field-programmable integrated circuit such as an FPGA or an embedded circuit (e.g. a system-on-chip, a multiprocessor system-on-chip), and a combination thereof. In some embodiments of the invention, the device further includes a multi-core central processing unit and the first processor includes at least one core of the multi-core central processing unit, and the second processor includes at least another one core of the multi-core central processing unit. In some embodiments of the invention, the network of the system includes a networking device (e.g. a router, a switch, etc.) for transmitting data obtainable as a result of running the already described tasks at the first processor (liquid computing) and the second processor (ground computing) of one or several devices (of the network) to an external network or a server thereof. In this sense, the data that is within the network may be transmitted to a computing device external to the network, for example a computing device configured to perform fog computing or cloud computing. The liquid computing layer and the ground computing layer may thus coexist, enhance and make use of synergies with fog/cloud computing. The external network may be in the cloud or/and in the fog. The networking device may be connected to the server of the network of the system, in which case the server transmits the data to the external network through the networking device. In some embodiments of the invention, the second processor of the device is further configured to dedicate part of the processing power to compute the at least one thread of the second processing task, that is, part of the processing power of the second processor is dedicated to HPC. In these embodiments, the part of the second processor not dedicated to the HPC may be dedicated to either locally compute a third processing task that includes solving a query (not linked to parallel computing) or, together with the first processor, to preprocess data and/or samples obtainable by the device. Such preprocessing may be especially applicable to critical systems wherein devices receive very large amounts of data in very short periods of time, and therefore a relatively large amount of local resources are required for capturing and preprocessing data.

The network may be deterministic, meaning that all the data generated within the network includes timestamps that permits identifying the exact time instant when the data was originated. In a particular embodiment, the network may be an Ethernet-type Real-Time deterministic network, such as White Rabbit. In an alternative embodiment, the network may be a TSN network, normally implemented on an Industrial Ethernet network.

The second processor of each device forming the computing cluster of the network works asynchronously. However, in some embodiments of the invention, the second processor processes data synchronously with respect to the second processor of other devices forming the computing cluster network.

Even though the device is suitable for IIoT, it may support the connection of machines and/or sensors not provided with IP, that is, machines and/or sensors that do not produce IP packets. Therefore, the device may be connected to machines and/or sensors with IP or other protocols like Modbus, PROFINET or 10-Link communication. This feature enables the device deployment in a wide range of industrial installations like, manufacturing, chemical and power generation, transmission and transportation, for example, nuclear power plants, wind energy plants oil refineries, natural gas processing plants, chemical treatment plants and manufacturing production lines.

A fourth aspect of the invention relates to a device for supervising operation of at least one machine of an industrial installation or for supervising such operation and actuating the at least one machine based on such supervision. The device comprises a first processor configured to compute a first processing task in real-time with data acquirable from a machine to which the device is connectable, the first processing task being for solving a first query. The device further comprises a second processor configured to locally compute a second processing task for solving another query.

The device may solve the first query and the another query locally with the first processor and the second processor, respectively, that is to say, neither the first task nor the second task computed by the processor are linked to parallel computing.

The device of the fourth aspect of the invention may be connectable to (other) alike devices so as to form a network. The devices may be configured to exchange data between each other through the network. The network may comprise a server. The server and at least some of the devices may form a computing cluster.

In some embodiments, the first processing task and/or the second processing task include processing the data obtainable from any device of the network (including the server or the same device) to form a data set for solving the first query and/or the another query. That is to say, both the first processor and the second processor are configured to process the data obtainable from any device of the network to form a data set for solving a query (not linked to parallel computing).

The device is capable of solving queries related to the operation of the at least one machine or at least one component thereof, in this sense the first query and the another query may relate to the operation of the at least one machine or at least one component thereof.

A fifth aspect of the invention relates to a system for supervising operation of at least one machine of an industrial installation or for supervising such operation and actuating the at least one machine based on such supervision. The system comprises a network comprising a plurality of devices. At least some devices of the plurality of devices are devices according to the fourth aspect of the invention. Each device of the at least some devices of the plurality of devices is connectable to a machine of the industrial installation and comprises: a first processor configured to compute a first processing task in real-time with data acquirable from the machine to which the device is connectable, the first processing task being for solving a first query; and a second processor configured to locally compute a second processing task for solving another query (that is to say, the second processing task is not linked to parallel computing).

A sixth aspect of the invention relates to an industrial installation comprising: a plurality of machines; and a network for supervising operation of at least one machine of the plurality of machines or for supervising such operation and actuating the at least one machine based on such supervision. The network comprises a plurality of devices. At least some devices of the plurality of devices are devices according to the fourth aspect of the invention. Each device of the at least some devices of the plurality of devices is connectable to a machine of the industrial installation and comprises: a first processor configured to compute a first processing task in real-time with data acquirable from the machine to which the device is connectable, the first processing task being for solving a first query; and a second processor configured to locally compute a second processing task for solving another query (that is to say, the second processing task is not linked to parallel computing).

In some embodiments of the invention, the second processor of a device is further configured to share its processing power with the network to which the device is connectable to, and to compute at least one thread of a third processing task when assigned by another device (i.e. the server) of the network, the third processing task being for solving a second query. In these embodiments, the network forms a computer cluster with at least some devices of the plurality of devices. The network further comprises a server configured to control the computing cluster; partition the third processing task into a plurality of threads; and assign one or more threads of the plurality of threads to the second processor of at least some devices of the plurality of devices. In this regard, the server comprises a processor configured to manage the computing cluster, to partition the third processing task in a plurality of threads, and to assign and transmit at least one thread to the second processor of at least some devices of the plurality of devices.

Further, similar advantages as described for the first, second and third aspects of the invention may also be applicable to the fourth, fifth and sixth aspects of the invention.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the invention can be carried out. The drawings comprise the following figures.

DESCRIPTION OF A WAY OF CARRYING OUT
THE INVENTION

Figure 1:
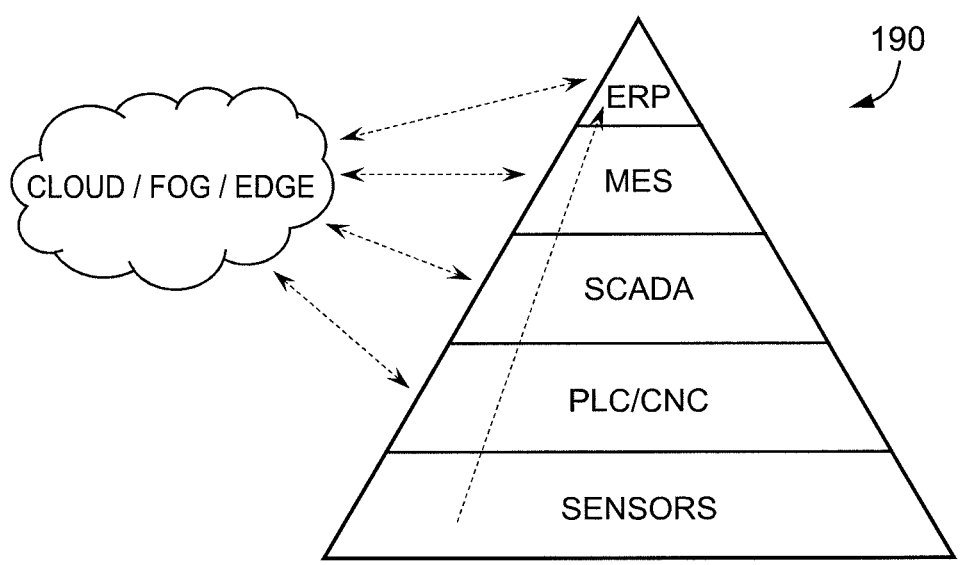
FIG. 1 shows the pyramidal model that illustrates the paradigm of how data is processed in IoT and/or IIoT-based industrial networks according to the prior-art.
Figure 2:
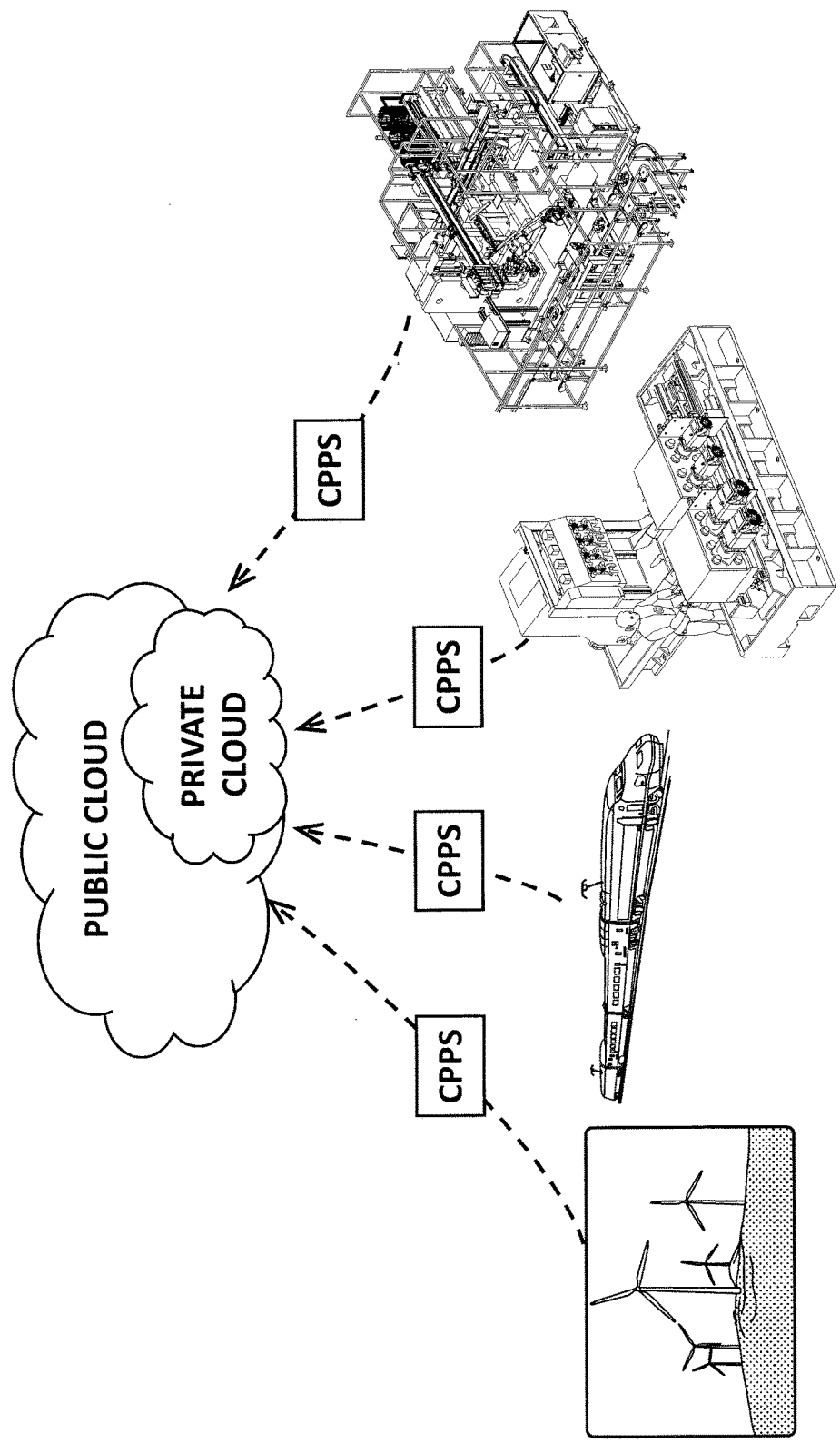
FIG. 2 shows a scheme of an architecture of the prior-art for the supervision of industrial installations.
Figure 3:
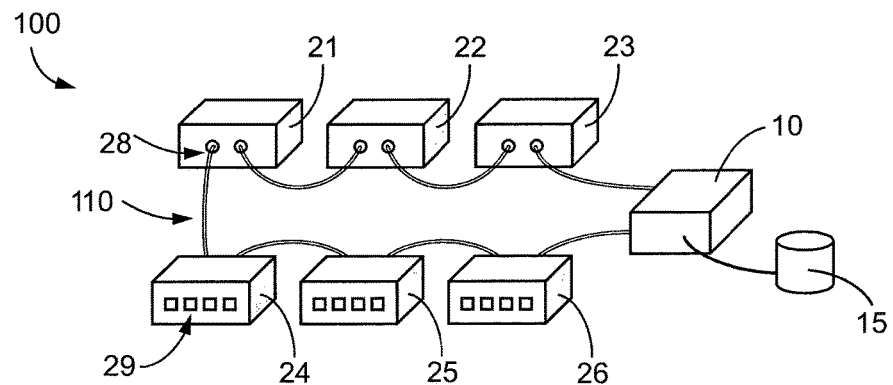
FIG. 3 schematically shows a system formed by a plurality of nodes in accordance with an embodiment of the invention.
Figure 4:
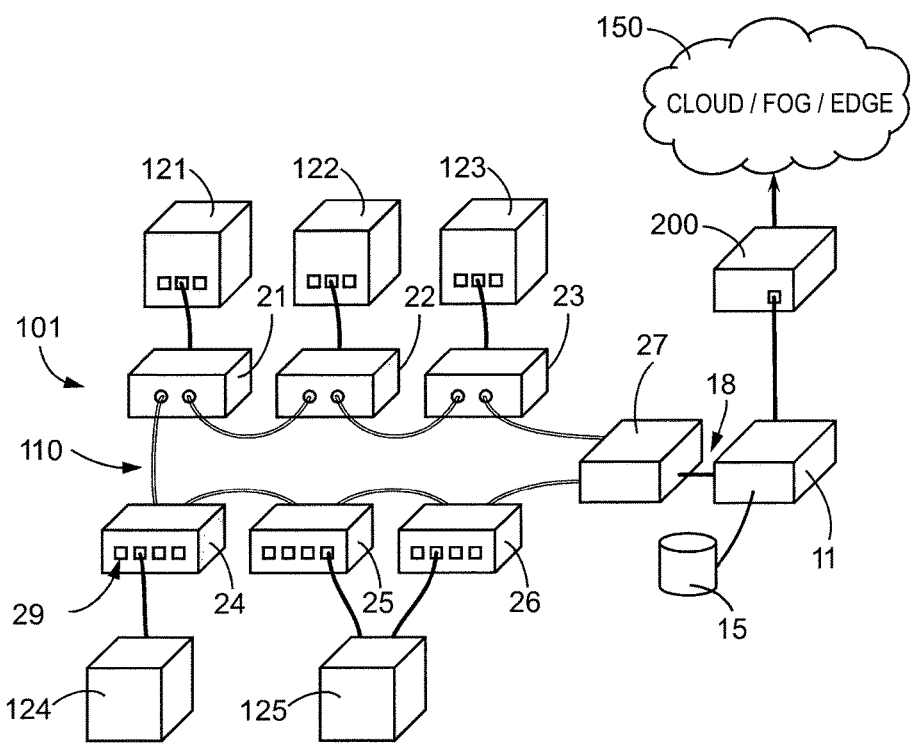
FIGS. 4 and 5 schematically show systems formed by a plurality of nodes in accordance with different embodiments of the invention, with the machines to which the nodes forming respective networks are connected, and also the interconnection of respective networks to the cloud/fog.
Figure 5:
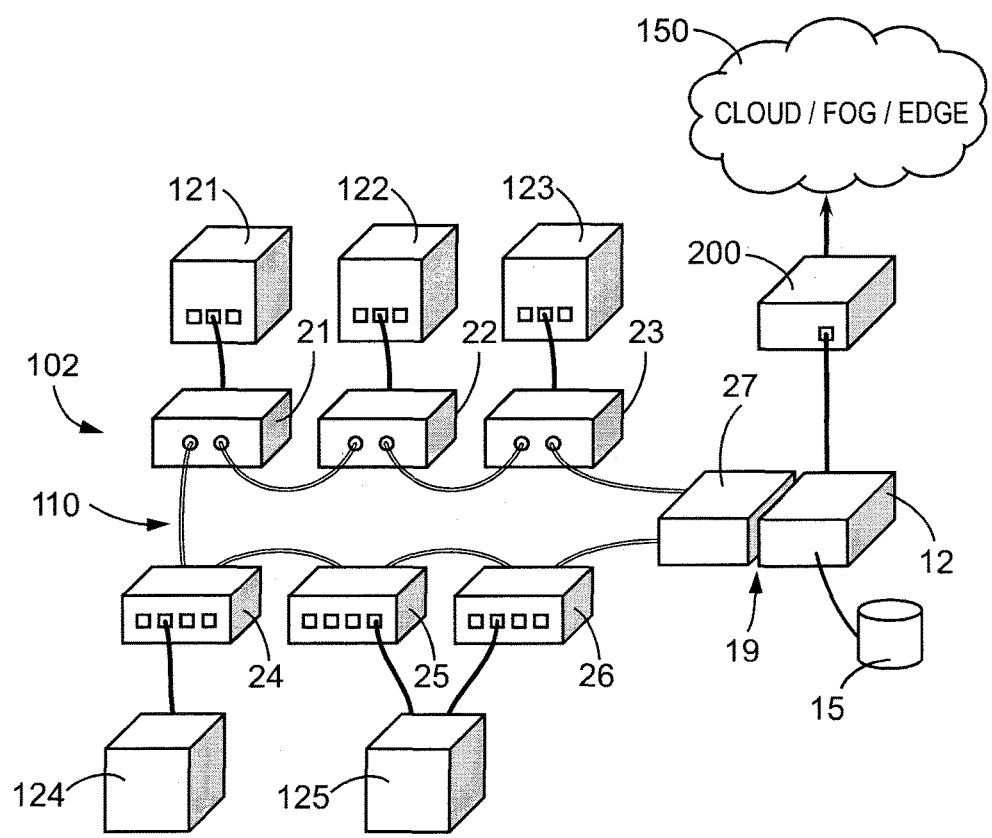

FIGS. 3 to 5 show different embodiments of a system forming a network in accordance with the present invention that may be particularly suitable for supervising and analyzing the behavior, operation and/or performance of one or more machines of an industrial installation and eventually for actuating the one or more machines and for predicting its behavior, operation and/or performance and prescribing a reaction to such behavior, operation and/or performance.

The network includes a plurality of devices and a server controlling the network and the devices thereof. Along this disclosure, the devices and server are also referred to as nodes of the network. Without limitation, the industrial installation may belong to one of the following fields: automotive industry, transportation industry, including maritime and aerospace, air traffic control industry, energy industry, medical equipment industry, cyber-defense industry and other purposes-manufacturing industry, among others. In the context of the present disclosure, a machine of an industrial installation refers to any device or machine used for carrying out an industrial process.

In FIG. 3, the system includes a network 100 in turn including a server 10 and a plurality of devices 21-26 configured as a computing cluster. Each device 21-26 has a first processor and a second processor, as described later, and is connectable to both a machine (or a component thereof) of an industrial installation (through interfaces or input/output ports 29) and a network (through interfaces or input/output ports 28) such as the network 100. The illustrated network 100 is implemented in a ring-topology, but any other topology that permits a computing cluster configuration is also possible, such as a star topology. Due to the nature of industrial installations, however, the use of a ring topology may be highly convenient since the network remains fully operative even after the failure of a communication link between two adjacent nodes; for the same reason, this topology eases the cabling of the network since once a new machine is added to the industrial installation, two adjacent nodes may be disconnected from each other such that a further device may be added in-between. Similarly, since the system is scalable and its processing power depends upon the number of devices in the network, it may be convenient to add further nodes to the network in the form of devices even if no new machines are incorporated to the industrial installation. The devices 21-26, as they are interconnected with links 110, form a computing cluster managed by the server 10. The server 10 is configured to assign threads of tasks to be computed to at least some devices 21-26 for high performance computing, as will be explained later. The links 110 preferably include optical fibers. The server 10 may comprise a device like devices 21-26, or it may comprise a different device, for example having enhanced or more powerful processing resources.

With respect to FIG. 4, each of the devices 21-26 is connectable to one or more machines 121-125 (for instance as per represented in FIG. 4) through one or more interfaces 29. The connection between a device and a machine may be a direct connection or an indirect connection (i.e. by means of an interconnection device, such as an Ethernet switch); further, this connection may be wired or wireless. A device is connectable to a machine so that it may acquire or receive multi-sensor data from it, for example by means of sensors, and/or by means of controlling devices (i.e. controllers) such as a PLC or a CNC that may actuate on the machine. In this sense, since the device is directly or indirectly connectable to the machine, when the device is connected to the machine the device may also send data to the machine when necessary (e.g. for adjusting parameters of a component, for turning off the machine, etc.).

Since each machine may produce different volumes of data (understood as encompassing samples), in some embodiments it may be necessary that more than one device is connectable to the machine in order to cope with the amount of data it generates. This is illustrated in FIGS. 4 and 5, in which the devices 25, 26 of respective networks 101, 102 are connected to machine 125, whereas each of the remaining devices 21-24 of the network 101, 102 is respectively connected to one of the machines 121-124. Because the devices 21-26 and the network 100, and similarly the devices 21-27 and the respective networks 101, 102, manage to reduce the reaction time to any inquiry or potential/actual malfunction in the machines associated with the networks 100-102, the networks 100-102 are especially useful in industrial applications where the consequence of a machine failing may be, for instance, a large economic loss.

As shown in the embodiments illustrated in FIGS. 4 and 5, the networks 101, 102 may be connected to the cloud and/or fog/edge 150 via a networking device 200 (e.g. Ethernet modem/router) of the systems that permits communication with the cloud and/or fog/edge 150. Such connection to the cloud and/or fog may also be implemented in the system of FIG. 3 (not illustrated therein). Particularly, in FIG. 4, a server 11 is connected through a communication link 18 to a device 27, and the server 11 is then connected to the networking device 200. Device 27 also forms part of the network 101. Thus the server 11 also works as a gateway enabling the connection of the network 101 to other networks external to the network 101, such as networks 150 for cloud or fog/edge computing.

Alternatively, as shown in FIG. 5, a server 12 may include a network interface 19 through which it is connectable to the device 27 and, hence, to network 102. The processing capacity of the server 12 may be added to the high performance computing functionality of the network 102. Processors of the devices 21-27 (e.g. second processors thereof) may run an instruction set architecture different from an instruction set architecture run by the server 12. When this is the case, the network interface 19 may be configured to convert instructions from the first instruction set architecture to the second instruction set architecture and vice versa. The server 12 is connected to the networking device 200 so that the network 102 may communicate with the cloud and/or fog/edge 150.

In any of the embodiments shown in FIGS. 3-5 the server 10, 11, 12 may include data storage means 15. The data storage means 15 are preferably non-volatile memory means, such as a hard disk drive (HDD) or a solid-state drive (SSD). The data storage means 15 may store any data, including data associated with queries, tasks and threads.

Figure 6A:
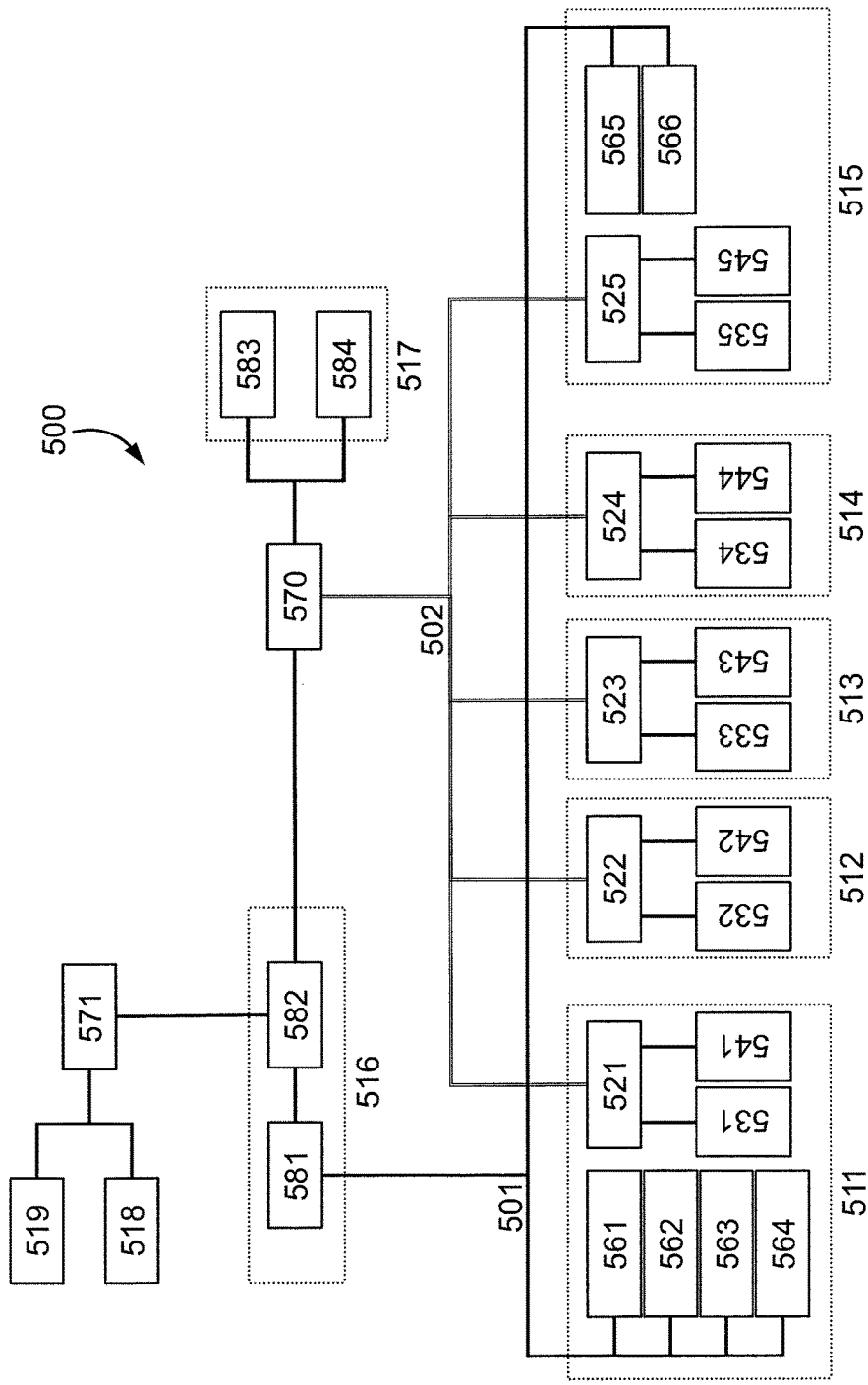
FIG. 6A illustrates a scheme of a machine of an industrial installation to which the device of the present disclosure is connectable.

FIG. 6A shows a scheme in the form of functional blocks of how the different units/subsystems of an exemplary machine 500 for machining parts are interrelated and how they are connectable to a device for sharing the data/sample/information generated in the subsystems/units. The outlined machine 500 is a typical machine in the field of automotive industry, but similar functional blocks may represent other machines in different fields.

The machine 500 of this example is composed by the following units, subsystems, and/or components:

A machining unit 511: Its function is to ensure that the tool for machining has accuracy, enough force and torque to perform the machining task with the required performance (quality, production rate . . . ). For this purpose, the machining unit 511 has four servo-controlled axes: X, Y and Z axis for the linear movement of the tool in the space and the S axis for controlling the rotation of the tool. Each axis is driven by a motor and controlled by a CNC 581 (generally encompassed by PLC/CNC block 516). A CNC bus 501 communicates the motors with the CNC 581, sharing a high quantity of information related to the status of the motors (power consumption, temperature, commanded trajectories, etc.) and the readings of sensors 561-564 (one for each axis) that are controlling the movement with high accuracy (encoders, temperature sensors, etc.). Besides, an I/O module 521 connected to a fieldbus 502 allows to connect additional sensors 531 (accelerometers, inductive switches, pressure switches, etc.) to the net and command other actuators 541 (counterweight cylinders, etc.) of the machining unit 511.

A clamping unit 512: This unit 512 clamps the part that is going to be machined. It must locate the part accurately and be able to absorb the cutting forces produced in the machining process. The actuators used by the mechanisms that clamp the part must be commanded and controlled by sensors 532 (limit switches, analogue position control switches, etc.). Sensors 532 and actuators 542 are connected to an I/O module 522 that is connected to the fieldbus 502.

A hydraulic/pneumatic unit 513: Many of the mechanisms of the machine 500 are driven by hydraulic or pneumatics cylinders. This unit 513 provides adequate flow and pressure to the mechanisms. Some sensors 533 (pressure, flow, temperature, level, etc.) control that this function is being performed properly while solenoid valves 543 manage the circuits. The sensors 533 and the valves 543 are connected to an I/O module 523 that is connected to the fieldbus 502.

A cooling unit 514: The cooling unit 514 provides cooling fluid to those systems of the machine 500 that need to be cooled. There are some sensors 534 to control that this function is being performed properly. Similarly to the hydraulic unit 513, some valves 544 manage the circuit. The sensors 534 and the valves 544 are connected to an I/O module 524, which is connected to the fieldbus 502.

A load/unload unit 515: It is the system that loads and unloads the part to be processed automatically in the machine 500. For this purpose the unit 515 has two servo controlled axes 565-566 connected to the CNC 581 as the ones in the machining unit 511. These axes 565-566 have to perform the movements of the unit 515. Besides, an I/O module 525 connected to the fieldbus 502 allows to connect additional sensors 535 (inductive switches, pressure switches, etc.) to the net and command other actuators 545 (grippers, etc.) of the load/unload unit 515.

A quality control unit 517: Taking into account the high production rates of these kinds of production lines in the automotive industry, it is mandatory to control that the quality of the produced parts is under specification. In this example, this function is performed by a camera 583 and a measuring touch probe 584, both of which are connected to a switch 570. A watt meter 518: It allows knowing how the machine 500 is working in terms of power consumption in order to optimize it. The watt meter 518 is connected to another switch 571. A human machine interface (HMI) 519: It provides an interface through which a user may interact with the machine 500. The HMI 519 is also connected to the switch 571.

The switch 570 has the fieldbus 502 as an input, and the switch 570 is connected to the PLC 582 of the PLC/CNC 516. The CNC 581 is also connected to the PLC 582, which in turn is connected to the switch 571. A device as described in the present disclosure may, for instance, be connectable to the machine 500 of FIG. 6A by means of switch 571, that is, the device may connect to the switch 571 in order to acquire the data of the machine 500.

In the scheme of FIG. 6A, switch 571 may communicate with the device connectable thereto using IP (Internet Protocol), and the data may be transferred using a protocol for reliable transmission, such as TCP (Transmission Control Protocol); the communication may be established by means of a physical connection or wirelessly. In alternative implementations, the device may directly connect to I/O modules in the machine with the corresponding interfaces/ports of the device. For this purpose, the device is provided with I/O ports that allow the connection of physical interfaces; the ports may be adapted for connection of different physical interfaces like, for instance but without limitation, RJ-45. In sum, each device (the devices in FIGS. 3-5) receives data and/or samples from a plurality of sensors provided in different elements or components of the machine, through interfaces directly or indirectly connectable to the sensors and/or to other sources of processing and communication means, such as controllers (e.g. PLC, CNC, etc.) of the machine. Non-limiting examples of sensors are temperature sensors, vibration sensors, pressure sensors, position sensors, speed sensors, CCD and/or CMOS cameras, microphones, among others. Alternative ways of connecting or interconnecting the I/O modules to a control unit may be implemented instead.

Albeit some machines of an industrial installation are provided with alarm systems that trigger an alarm when one or more measured values are beyond threshold values, these systems are not capable of analyzing all the data outputted by the machine, its controllers, and/or its sensors; the outputted data may be indicative of possible failures even when the measured values are within an interval which corresponds to normal operation. Thus, in order to check the operation of a machine and react thereto or predict its performance or operation (e.g. possible failure, efficiency or productivity reduction, quality assurance, etc.) so as to anticipate a failure for example, it may be necessary to solve queries with the data provided by the machine and its associated devices (e.g. sensors, actuators, controllers, etc.), as will be explained in detail later in this disclosure.

Figure 6B:
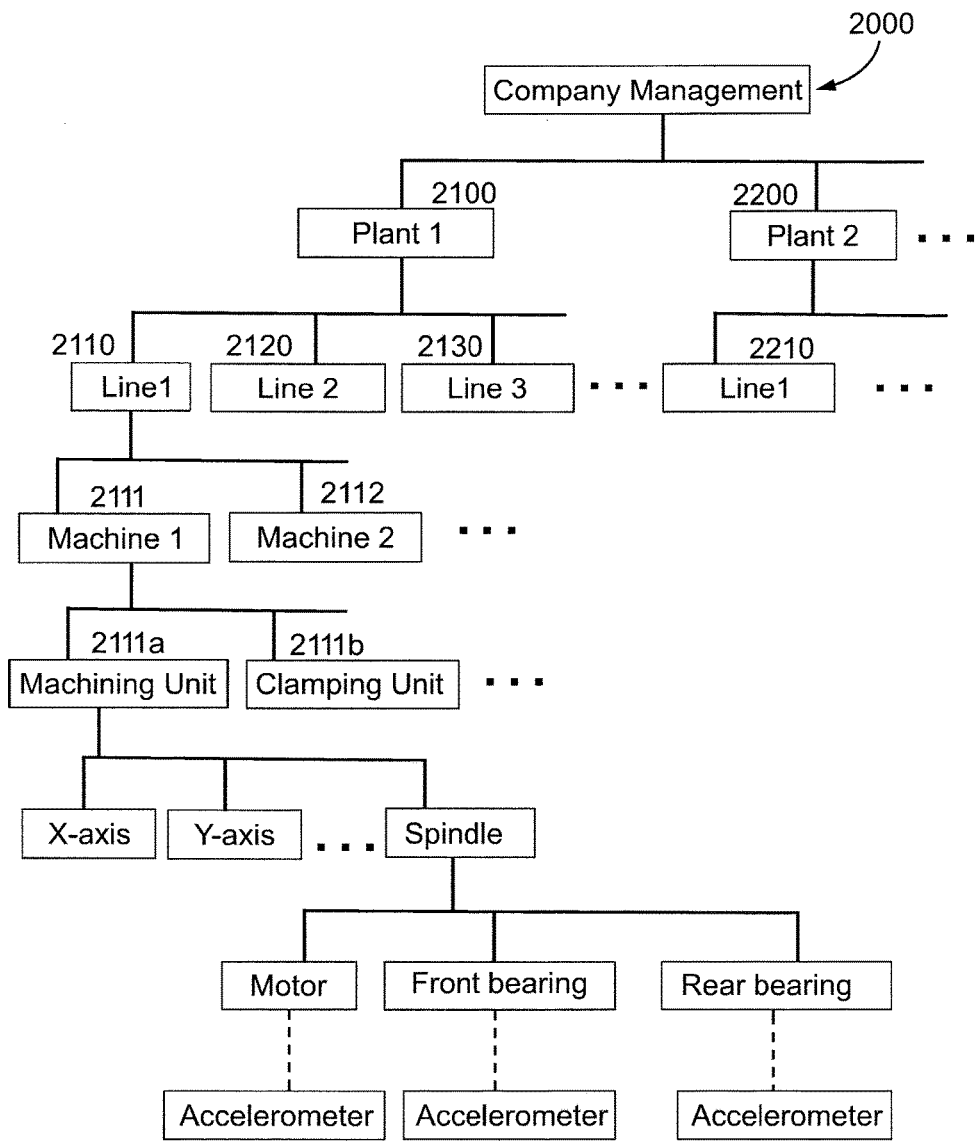
FIG. 6B illustrates a scheme of the worldwide industrial infrastructure of a company; the infrastructure may be controlled by the devices and system of the present disclosure in cooperation with existing cloud/fog facilities.

With reference to FIG. 6B, it is explained how the device, network and system of the present disclosure enable the control of an industrial environment and enable the provision of a proper response to the demanding conditions of controlling an industrial environment. It is also explained how the network coexists, enhances and makes use of synergies with fog/cloud computing.

FIG. 6B schematically shows the levels into which the worldwide industrial infrastructure of a company may be divided. In an upper level 2000 a final client or company is represented. The company may operate for example in the automotive industry. Company Management 2000 may have different industrial plants 2100, 2200 spread worldwide, represented in a second level in FIG. 6B. For example, a first plant may be located in Europe, a second plant may be located in America and a third one may be located in Asia. Each plant is composed of several industrial lines, forming a third level. As a matter of example, in FIG. 6B three lines 2110, 2120, 2130 of the first plant 2100 are shown and one line 2210 of the second plant 2200 is shown. A fourth deployment level is composed of machines which form part of each industrial line. For example, in FIG. 6B, two machines 2111, 2112 belonging to line 2110 are schematized. One of these machines may be, for example, the machine 500 shown in FIG. 6A. Like in FIG. 6A, the machines 2111, 2112 belonging to line 2110 comprise several components. The machine 2111 may be a machining tool comprising a machining unit 2111*a*, a clamping unit 2111*b*, etc. Each component may have, in turn, several elements; for instance, the machining unit may comprise servomotors for moving the machining unit along 3 axis (X-axis, Y-axis and Z-axis) and a spindle. The spindle in turn comprises different sub-elements to be controlled, such as a motor, a front bearing and a rear bearing. Sensors, such as the accelerometers shown in FIG. 6B, may be used in order to control the many sub-elements of a machine. A system for analyzing the behavior, operation and/or performance of an industrial installation as disclosed in accordance with FIGS. 3-5 may be used for example for controlling the operation of each line 2110, 2120, 2130, 2210 shown in FIG. 6B, for example by connecting at least one device (such as device 20 of FIGS. 7A-7B) to each machine of each line.

Now, controlling the business schematically represented in FIG. 6B involves different levels of control or supervision. In a business management world, this control is applied by posing queries whose answer reflects the operation and/or performance of the whole or a part of the business. For example, in order to check the behavior of a component and react thereto, or to predict the performance of an installation (e.g. possible failure, efficiency or productivity reduction, quality assurance, etc.) so as to anticipate a failure for example, it may be necessary to solve queries with/from the data provided by the machine and its associated devices (e.g. sensors, actuators, controllers, etc.). For instance, a query may relate to the operation or status of a component of a machine, or to the operation or a status of a machine, or even to the operation or status of a whole industrial line or installation or to the evolution of the whole worldwide business. Queries may be defined at a device of the network, at the server thereof or even outside the network formed by the devices, for instance at a server located in the cloud/fog/edge in which case the queries may be transmitted to the nodes and processors thereof by means of communication links. As will be explained with reference to FIG. 8, in order to solve a query, a task associated with the query must be computed. In other words, a task comprises or involves all the processing necessary for providing an answer to the query. Some non-limiting examples of queries for supervising different levels of an industrial business are as follows next. In a thermal heat treatment, in which a high speed thermographic camera is used for controlling the treatment process (such a camera is for example included in the machine shown in FIG. 6A and referenced as 583), different queries may be posed: "Has the thermal process started?", "Is the heat source working?", "Is the temperature distribution suitable to get the required surface treatment?", "Is there any surface at risk of reaching fusion temperature?", "Is the temperature distribution constant for each work product?". In a rotating component having ball-bearings, different queries may be posed: "Is the ball pass frequency of the inner ring below its maximum limit?", "Which is the instantaneous acceleration amplitude for the ball spin frequency?", "Which is the remaining useful life of a ball-bearing component?", "Is the ball-bearing having abnormal degradation?", "Does the ball-bearing need to be replaced or serviced?" The former queries are queries related to the operation of a machine or a component thereof. These queries are also referred to as first queries and second queries, as explained with reference to FIGS. 7A-7B. By way of example, another second query may be the determination of the operation of a machine in comparison to the operation of other machines of the same type. That is, according to the operation of all the machines of a same type, a normal functioning model is made, comprising any small variations among machines of the same type. Then, the state of a machine may be constantly calculated and compared to the normal model.

Figure 7A:
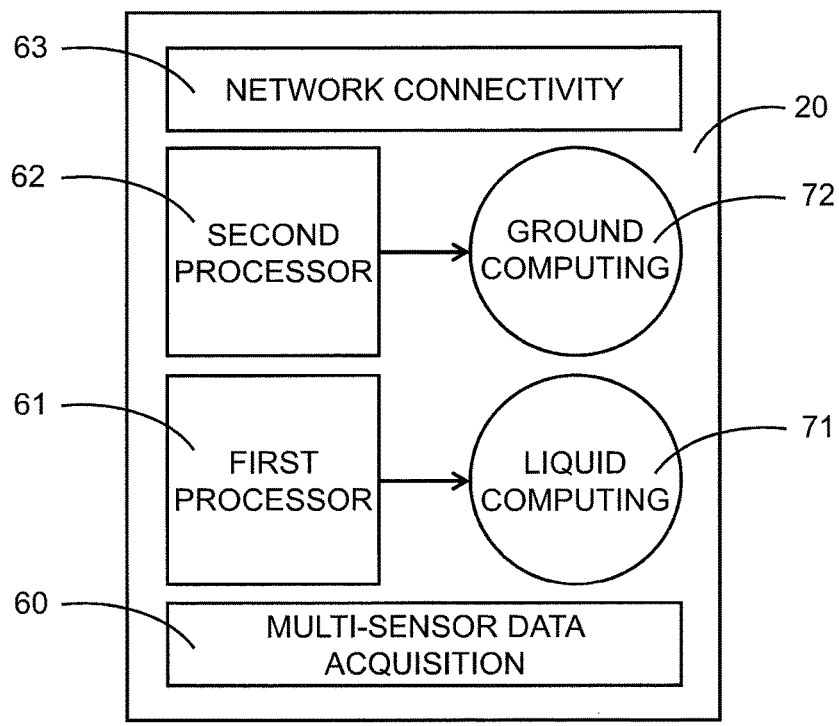
FIG. 7A schematically shows the interfaces and processors of a device in accordance with an embodiment of the invention, and FIG. 7B schematically shows several functionalities that such device may be provided with for its operation.

Other queries referring to a higher level of abstraction, such as queries concerning the knowledge (contextualized information) of the industrial installation (i.e. an industrial line, a plant or even a group of plants), such as business-related queries, are the ones dealt with outside the computing cluster network. These queries are preferably dealt with in the cloud and/or in the fog/edge. Non-limiting examples of these queries are: "How many human resources does the industrial installation need in order to guarantee an Overall Equipment Efficiency of 90%?" Or "how many parts can this installation produce if the Overall Equipment Efficiency is of 90%?" These queries usually have as inputs the solutions to queries dealt with at ground computing level (that is to say, within the computing cluster), as a consequence of which the volume of data sent and treated in fog/cloud/edge computing is reduced with respect to the volume of data dealt with in ground computing. Ground computing level is described in detail with reference to FIGS. 7A-7B. FIG. 7A schematically shows a device 20 in accordance with an embodiment of the invention in a block diagram form. The device 20 may be, for example, any of the devices 21-26 illustrated in FIG. 3, or any of the devices 21-27 illustrated in FIGS. 4-5.

The device 20 comprises a multi-sensor data acquisition block 60 through which the device 20 is connectable to a machine (for example the machine 500). The multi-sensor data acquisition block 60 includes data acquisition software and sensor interfacing. In other words, the multi-sensor data acquisition block acts as an interface with one or more ports of a machine belonging to the industrial system, installation or infrastructure under control. This interface is also illustrated in FIGS. 3-4 as ports 29; the ports 29 may directly or indirectly provide an interface with sensors. Some non-limiting examples of sensors are temperature sensors, vibration sensors, image-capturing sensors, among others.

The connection between a machine and a respective device may be wired or wireless; the device may be connected to a controller (e.g. PLC, CNC) controlling the machine, or to a field bus through which data originated in different sensors belonging to a certain machine are transmitted. This connection may be direct (direct connection between the device and the machine) or indirect (through a hierarchical chain for example).

The device 20 further comprises a first processor 61 which is configured to perform liquid computing 71. Particularly, the liquid computing 71 relates to computing a processing task for solving a query. For computing the processing task, in liquid computing 71 the first processor 61 processes the multi-sensor data acquired through the multi-sensor data acquisition block 60 (from a machine); processing the multi-sensor data may encompass preprocessing the data and/or selecting variables from the multi-sensor data. When the first processor 61 performs liquid computing 71 it carries out the processing of data and solving of a query locally and in real-time (also referred to as a first query) so that the system may detect and react to a sudden anomalous behavior or operation of the machine.

In some embodiments, the first processor 61 may further comprise a central processing unit having programmable hardware/electronics, such as, but without limitation, a field programmable integrated circuit such as an FPGA (i.e. field-programmable gate array), thus configured to run a real-time operating system which manages the field-programmable integrated circuit or SoC and the liquid computing 71. This enables the computation of tasks associated with first queries in processing cycle times, such as between 1/1.5 GHz and 1/0.8 GHz, that is to say, between 0.67 ns (nanoseconds) and 1.25 ns. Thus, supervision of a machine or of a component thereof may be achieved in Real Time. Besides, embodiments in which the first processor 61 includes a field-programmable integrated circuit are especially advantageous in applications in which quick programming/reprogramming of queries is desired, because these circuits permit such quick programming/reprogramming.

For instance, referring back to FIG. 6B, a query related to any machine or component in any plant 2100, 2200 may be reprogrammed remotely by an operator offline. In other words, queries—either first queries, or second queries, or queries of a higher abstraction level-, may be defined at a device 20 of the network 100, 101, 102, at the server 10, 11, 12 thereof or even outside the network formed by the devices, for instance at a server located in the cloud/fog. This enables remote reprogramming of a query from any remote physical location providing an access to the cloud/fog is available.

In addition, the device 20 also comprises a second processor 62 that is configured to perform ground computing 72. When performing the ground computing 72, the second processor 62 may solve threads into which a task associated with a query is divided, as explained later with reference to FIG. 8, when the device 20 forms part of a network in a computing cluster configuration (such as the network 100, 101, 102 of FIGS. 3-5), that is, in an HPC configuration. Therefore, in this case, an answer or solution to these queries may be obtained by computing a task in a distributed matter. Accordingly, the second processor 62 of the device 20 cooperates with the second processor of other devices within a same network to solve a query (also referred to as a second query). The second processor 62 is intended to solve threads (portions of a task associated with the query) when performing ground computing 72. The threads are parallelizable parts of the task associated with the query to be solved and which the server of the network distributes across the devices of the network. Thus, second queries are queries associated with tasks of parallelizable nature, that is to say, tasks solved with HPC. A second processor 62 of a device 20 locally solves the thread assigned to it by the server of the network. The second processor 62 may also compute tasks independent from the HPC, that is to say, it may perform data processing not involving cooperation with other of devices of the network.

Figure 8:
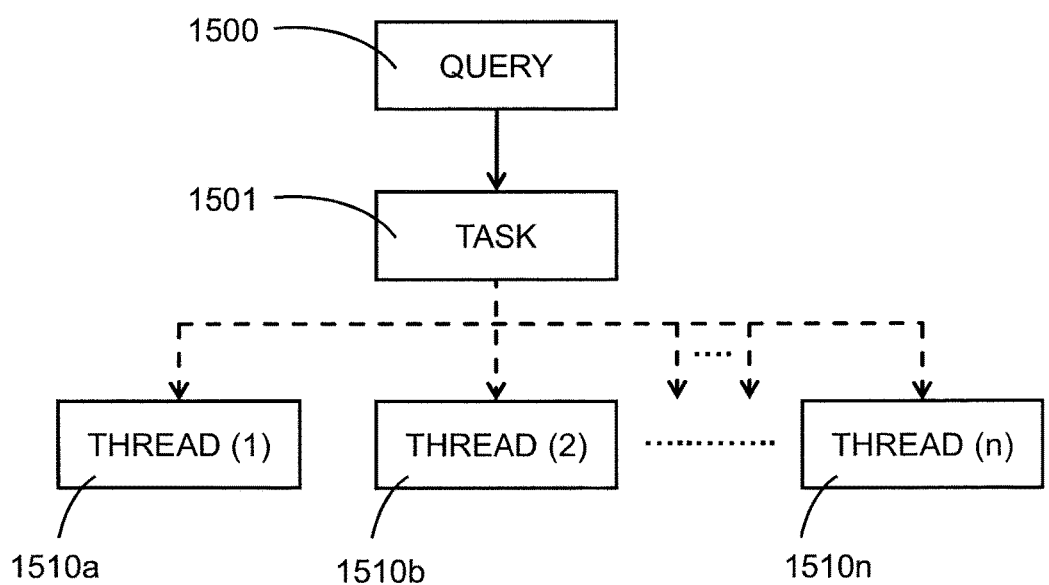
FIG. 8 diagrammatically illustrates a query solvable by a device in accordance with an embodiment of the invention, either locally or in parallel with other devices.

FIG. 8 diagrammatically illustrates a query 1500. A first processor 61 or a second processor 62 of a device in accordance with an embodiment of the invention may solve the query 1500, which for instance may provide information regarding a behavior, operation or a status of a machine (or a component thereof) of an industrial installation. In order to solve the query 1500, a task associated 1501 therewith must be computed. The task 1501 comprises all the processing necessary for solving the query 1500. In some cases, the first processor 61 may solve the query 1500 by locally computing the task 1501. Particularly, in some of these cases, the task 1501 comprises processing data thereby solving the query 1500; processing data may entail preprocessing data and/or selecting specific variables of the data once preprocessed, and then processing the data once preprocessed and/or once specific variables have been selected. In some other cases, the query 1500 is solved by more than one device, that is, the query 1500 is solved in a distributed manner. Accordingly, a server (for instance as shown in FIGS. 3-5) of a network may parallelize the computing of the task 1501 by partitioning it into several threads 1510a-1510n (shown with dashed arrow lines for illustrative purposes only) so as to perform HPC. Each thread 1510a-1510n may be sent to one or more devices so that the second processor thereof may compute it. By computing all threads 1510a-1510n, the task 1501 may then be computed so as to solve the query 1500. Further, in some cases, once all threads 1510a-1510n have been computed, prior to solving the query 1500 further processing of the result of the task 1501 may be necessary to solve the query 1500. By partitioning a task into threads, the time for solving the same may be shortened in a larger or smaller degree depending on the number of devices (and the processing power of their second processor) available for performing ground computing 72. In the ground computing 72, the second processor 62 of the device 20 may use any data or information obtained from any device of the network or the server itself by means of the network connectivity block 63, and/or from the first processor 61 of the same device 20. When the data or information to be used in the ground computing 72 are obtained from other devices or the server, the packets will arrive to the device 20 from one of the two nodes (or even from both nodes, in which case one set of packets is discarded) adjacent to it when the network has a ring topology, however this does not mean that the system is limited to communications between adjacent nodes: a node retransmits the packets so that these go from node to node until they arrive to the destination node.

The network connectivity block 63 may comprise one or more interfaces through which the device 20 is connectable to a network. In the preferred embodiment in which the network features a ring topology, the network connectivity block 63 includes at least two interfaces, and preferably it comprises a low-latency network switch for frame forwarding such as a 3-port switch: two of the ports being devoted to the ring connectivity and one Ethernet internal port for communicating with the multi-sensor data acquisition block 60.

Figure 7B:
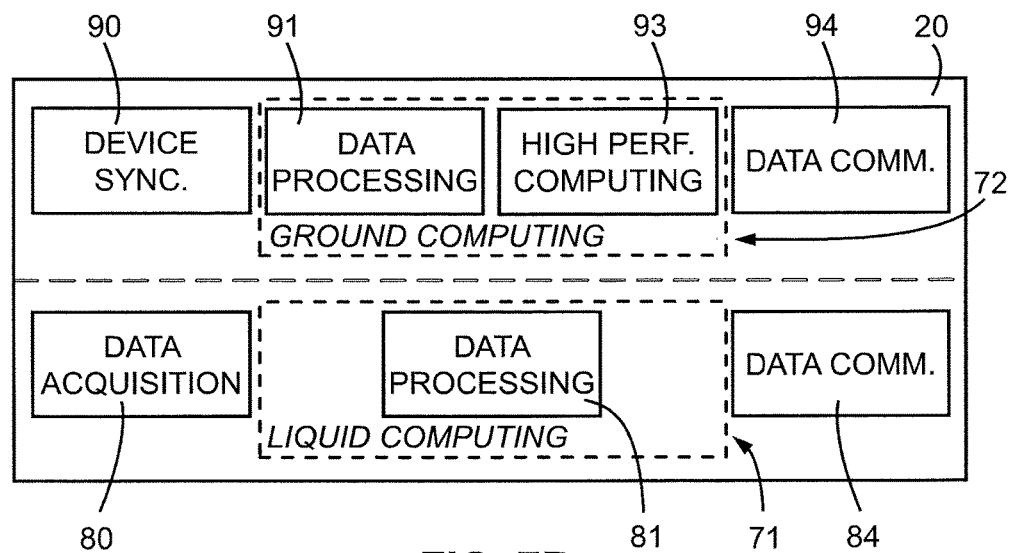

FIG. 7B shows in a block diagram several functionalities that the device 20 is provided with in an embodiment of the invention. The device 20 is hierarchically organized in two parts: a first part (the lower half of the device 20 as shown in FIG. 7B for illustrative purposes only) devoted to liquid computing 71, that is, to locally process data and solve tasks (for instance to answer first queries) 81 with the data as processed; and a second part (the upper half of the device 20 as shown in FIG. 7B for illustrative purposes only) devoted to ground computing 72.

With respect to the lower half of device 20, the device 20 acquires data from the one or more machines it is connectable to. After the data acquisition 80 stage, the first processor 61 of the device 20 processes 81 the data. Data processing 81 may encompass preprocessing, whereby the multi-sensor data are processed to form a first data set smaller in size than the original data. Examples of preprocessing performed at this stage may include for example cleaning meaning less data (i.e. those out of the operating range of a sensor), defining precision in data gathering (e.g. truncating decimals so as to convert the variable of a numeric data type to another data type with less bits if the truncated decimals may be neglected), data transformations (e.g. computing mean values, median values, standard deviations, entropies, changes of domain such as from the time-domain to the frequency-domain with the Fast Fourier Transform for example), and application of already-trained models for variable selection for saving data transmission bandwidth (for example, selecting points or pixels of interest in a high resolution digital image or extracting background information from a digital image). A reduction in the quantity of data remaining to be processed is achieved thereby minimizing overall further computations and power consumption. Data processing 81 may also encompass a selection of variables. Thus, from a first data set (for example generated in a preprocessing stage), the first processor 61 of the device 20 may carry out a selection of variables so as to reduce the number of variables that are redundant or have low significance according to the further processing to be performed by the first processor 61 for solving queries, whereas some other, variables may contain meaningful information for the first query or queries (or even for other purposes, for instance for solving other first query or queries, for sharing with other devices within the computing cluster network that may need them, for fog/cloud computing, and/or for logging purposes). The variable selection contributes to or enables reducing overfitting within the computations performed later. It should be noted that, in some embodiments, a single device may receive data from hundreds of sensors leading to elevated throughputs; from the large volumes of data which are processed, a fraction of the data may be sufficient to solve the queries, thus the variable selection may reduce the amount of data that will be used in the task computation without affecting its outcome, that is, without biasing the solution to the query associated with the task being computed. In other words, owing to a variable selection stage, the efficiency may be increased by reducing the computational burden in the task. An example of a variable selection may refer to a digital image with thousands of pixels from which only few pixels have been extracted in a preprocessing stage; in the variable selection stage a subset of pixels of the already-extracted few pixels are selected since this subset, together with variables different from this particular digital image, may be sufficient to compute a determined task. Another example may refer to the vibration of determined components within a device wherein the local data processing 81 may produce the frequency spectrum of the vibration; part of the spectrum may be discarded since it does not contain any useful information. Then, the variable selection may just extract particular values of the remaining part of the spectrum which are relevant for solving some queries in the data processing 81 of the liquid computing 71.

With the data set obtained after the variable selection stage, the first processor 61 solves a task (associated with a first query). The task can be solved locally (at the first processor 61) because the original set of data may have been reduced by applying preprocessing and selection of variables. Thus, the first processor 61 may work with a reduced quantity of data and computes a task with that data; the first processor 61 performs computations using part or all the computational capacity that the first processor 61 has available.

The upper half of the device 20 is devoted to ground computing 72. In ground computing 72, the device 20 performs HPC 93 so that queries (second queries) demanding large processing power, that is to say, queries associated with tasks whose computing require large processing power, may be solved faster when distributed between several devices by means of threads of the parallelizable task associated therewith. The second processor 62 may also compute tasks independent from the HPC by performing local data processing 91, that is to say, data processing not involving cooperation with other second processors of devices of the network. This processing 91 may encompass preprocessing and/or variables selection.

Even though the second processor 62 is configured to work in a computing cluster configuration, the way in which the second processor 62 works for solving threads of a parallelizable task (the task representing the computational work to be computed for answering a query) may be similar to the operation of the first processor 61. The second processor 62 may processes data (different in general from the data acquired in the liquid computing part) which it has obtained either from the device 20 itself or from the network.

When working in HPC mode, the second processor 62 provides a solution to the thread it has been requested to compute by the server. The output of the thread is generally transmitted to the server of the network where all the different outputs produced within the network (that is, from other devices of the network) are gathered for their integration in the task. By computing all threads (by the server itself or by a device assigned by the server), the task may be computed so as to solve a query. In some cases, once the task has been computed, prior to solving the query further processing of the result of the task may be necessary to provide an answer to the query. The data communications 94 block represents that the second processor 62 may send the solution to the thread and/or other data with either a deterministic data transmission protocol (that may be particularly convenient when it must be ensured that the data reach their destination without being altered by a party that may have gained illegitimate access to the network; examples of such protocols are Data Distribution Service, i.e. DDS, for Real-Time Systems and Time Sensitive Network, i.e. TSN) or a non-deterministic data transmission protocol (that may be particularly convenient when the data to be transmitted is not critical—e.g. for logging purposes or for non-immediate actions—since such protocols will not access the communication channel if there is no free bandwidth available; an example of such protocols is Open Platform Communications Unified Architecture, i.e. OPC-UA) and that, similarly, it may receive data from the network it is connectable to wherein the data is transmitted with either a deterministic data transmission protocol or a non-deterministic data transmission protocol. The communications may be managed by the second processor 62 and/or the means for connecting to the network.

Even though it is not illustrated in FIG. 3-5 or 7A, the device 20 may further include data storage means (not illustrated) accessible by the second processor 62. The data storage means are preferably non-volatile memory means, such as a hard disk drive (HDD) or a solid-state drive (SSD). The data storage means may store data (e.g. samples, solutions to threads, solutions to tasks, queries and solutions thereto, etc.) receivable by the device 20 and which the second processor 62 may process, and/or use for the solving of threads, tasks and/or queries. The data storage means may also store or buffer data (e.g. samples, solutions to threads, solutions to tasks, queries and solutions thereto, etc.) so that the second processor 62 may transmit data to another device of the network 100, 101, 102 and/or the server 10, 11, 12 thereof once the communications channel has available bandwidth, thereby not losing the data when the device 20 cannot transmit because of the entire bandwidth being occupied. The device 20 may also include volatile memory means, such as RAM (random access memory), through which data or solutions to tasks may be transferred between the first and the second processors 61, 62. The first processor 61 of the device 20 may store data in and retrieve data from the volatile memory means; by way of example, the first processor 61 may buffer sensor data prior to preprocessing the sensor data, and may buffer preprocessed data and or data resulting from computing a processing task prior to transmitting them to either the second processor of the device or the network.

Still referring to FIG. 7B, the upper half of the device 20 may also be provided with cybersecurity mechanisms (not illustrated) directed to prevent hacking attacks from outside of the network and protect any data transferred across the network from being read by an unauthorized person or party if the data packets are captured by the person or party. Accordingly, the device 20 may comprise a firewall that may be software-implemented and whose purpose is to block any communications from outside of the network which seem not to have the necessary privileges or permissions for establishing communications with the device 20; the firewall may be run in the second processor 62. Further, another cybersecurity mechanism implementable in the device 20 is the ciphering and deciphering of the data in the data packets to be transmitted to the network or received from it so as to provide an additional security layer.

The device 20 further includes mechanisms for device synchronizing 90, for example using Precision Time Protocol (PTP), so that each device of the network may acquire data at the same time instants.

The two computing levels (liquid computing at the first processor 61 and ground computing at the second processor 62) may coexist with other existing computing paradigms, like cloud/fog/edge computing, in order to provide answers of different types of queries, for example queries involving different aspects or levels of the industrial business as schematized in FIG. 6B. The queries to be solved by the device 20 or a network comprising the device 20 may be defined by operators monitoring the status and performance of the industrial installation, namely controlling the correct operation of the machinery within the industrial installation. The queries may be defined in a device 20, or in the server 10, 11, 12, or beyond the system including network 100, 101, 102, for instance in the cloud/fog/edge. An example of a rather simple query associated with a machine for machining parts may be to check whether the vibrations undergone by a bearing are within a particular range (e.g. in terms of frequency and/or amplitude) considered to be normal or correct. This query is preferably solved in real time in the first processor of the device. This kind of information may only be extracted from the sensors that sense the bearing while it is in operation, for instance from the accelerometers linked to such bearing. An example of a more complex query may be to check whether all the mechanisms of a robot arm are functioning as expected and whether the remaining useful life of each and every one of them is at least two weeks. In this case, there may be up to tens or hundreds of sensors that relate to the mechanisms whose sensor data and/or samples may provide the answer to the query only if the data are properly processed and combined. This query does not need to be solved in real time and may require the processing capacity of the second processor of several devices (that is to say, HPC). In this sense, it is necessary that the data gathering is carried out in a synchronized way and provide the same timestamp so that any problem occurring in a component or machine may be identified and troubleshot with the data (if the data are acquired at different time instants, it may not be possible to trace the causes generating the problem); this does not mean that all the sensors must produce data at the same rate, a sensor may sense with more or less frequency depending on the temporal evolution of a magnitude (e.g. the room temperature is not expected to change significantly every second whereas the power of a laser might vary significantly many times in one second) as long as the sensor data corresponding to a particular time instant may be identified for their processing.

The nature of the sensors may be quite variable: whereas an ambient temperature sensor may output data at a rate of few bytes per second, an accelerometer in a bearing may output data at a rate of kilobytes per second (for example 20-30 kB/s), or a digital camera may output data at a rate of megabytes per second. It is clear that the data quickly add up and the aggregate throughput for a single device may be in the order of units or tens of megabytes per second. For solving a query by computing a task, the data must then be processed and the solution to the task must be extracted.

By way of example, if one were to monitor a single spindle of a machining tool, the data for monitoring the spindle may comprise variables such as the vibrations of each of the axis, the bearings, the cage and the tracks that may be sensed at 20 kilohertz, and also variables such as the power, the torque, the temperature and the angular velocity of the spindle, these variables being data sensed at 10 hertz for example. Aggregating all these data, the throughput may be 0.5 megabytes per second. The time it may take for providing a solution to a query associated with the data outside the industrial installation (i.e. in the cloud or in the fog) may be in the order of several seconds or even minutes if the communication channel has sufficient bandwidth, the latency is low, and there are sufficient computing resources readily available. Further, it must be taken into account that while the data are being transferred and processed either in the fog/edge or in the cloud, additional data are being generated by the same sensors and controllers which should also be analyzed because the behavior of the spindle may have changed already. The first processor (liquid layer) of the device may acquire the data involved and perform for example a fast Fourier transform (FFT). Then, if for example the amplitude of a frequency of interest (included in the FFT) is above a threshold, an alarm is sent to a supervision system for further action.

As already explained, the two computing levels (liquid computing at the first processor 61 and ground computing at the second processor 62) may coexist with other existing computing paradigms, like cloud/fog/edge computing. For example, by analyzing the instantaneous power consumption of each machine, improvements in the whole installation can be planned. This query belongs to the business world, typically dealt with in the cloud/fog/edge. Another exemplary query of this kind is: "How many human resources does the industrial installation need in order to guarantee an Overall Equipment Efficiency of 90%?"

Every time a new device (such as device 20) is integrated into the network as illustrated for example in the embodiment of FIGS. 3-5, the demand for processing/computational resources within the network may increase due to the addition to the network of the multi-sensor data collected by the new device. However, the processing/computational resources of the network are simultaneously increased thanks to the incorporation to the network of the first and the second processors of the new device, and especially thanks to the second processor since it is added to the distributed processing of the HPC. The server of the network monitors the status of each device of the network in terms of the load and the progress solving a particular task or portion of a task (i.e. thread). The server communicates with the devices in order to do so, for instance using message passing protocols such as MPI (Message Passing Interface). The network may be configured to permit scalable expansion by addition of new devices to the network and the server be configured to assign new or already existing processing tasks to the new devices. For example, upon connection of a new device, a synchronization process may be executed to synchronize the processing of the second processor of all the devices within the network. The distributed processing (HPC) is performed while maintaining the synchronization requirements of the network. Therefore, the workload is distributed across multiple devices.

The first processor of the devices of a network 100, 101, 102 work synchronously for processing all the data received from the machines 121-125 and computing tasks, whereas the second processor comprised in each device may work synchronously or asynchronously with respect to the second processor of corresponding devices within the computing cluster when they are computing tasks or threads into which a task is divided.

The devices and the server of the network 100, 101, 102 may be configured to run different protocols and processes which permit a correct distributed computing. The second processor of the devices may communicate with other devices and second processors thereof by means of message passing communication protocols (e.g. MPI); the devices and the server send and receive messages using this kind of protocols for carrying out distributed computing. The message passing protocols may be used within frameworks or programming models that may be geared towards asynchronous and heterogeneous parallel computing, that is, frameworks or programming models that support solving the threads asynchronously and by processors of different natures (e.g. one or several cores of a central processing unit, one or several graphics processing units in a parallel configuration, field-programmable integrated circuits, etc.).

The server 10, 11, 12 manages the HPC within the computing cluster. In particular, it partitions the tasks to be solved in parallel to form a plurality of threads of the task for high performance computing. It also transmits the parts (threads) of such task to some devices for HPC; since the server 10, 11, 12 is aware of the load status of each device, the server 10, 11, 12 may transmit the threads of a task to selected devices of the network which have enough free processing power to compute them. The server 10, 11, 12 receives solutions to the threads from corresponding devices, and reassembles them so as to compute the task and eventually to provide an answer to a query.

A cluster workload manager in the server distributes the threads across the network 100, 101, 102 by centralizing the following: threads to be solved, information related to the (available) processing power of each device, and in some cases the requests from the devices to solve a task in a distributed manner. The cluster workload manager decides which thread is assigned to each device (it may be only some devices of the network or all the devices of the network, since only a subset of the devices of the network may be used to solve the threads) based on the status of the devices, and then sends the threads by means of a message passing protocol. In this regard, a monitoring module or library may dynamically determine the workload of each device and the associated available capacity for HPC thereof. Another module or library (e.g. Dynamic Load Balance or DLB) may dynamically balance the load in the devices by adjusting the number of active threads (of the second processor thereof) used in a determined process. With the cooperation between the different modules and processes in charge of the HPC the server 10, 11, 12 knows at all times what is the status of the network 100, 101, 102 and the devices therein so that, for example, the cluster workload manager may adjust the operation of each device upon a change in the urgency in which a task for solving a query must be solved or a new urgent query is declared, thereby speeding up the solving of a particular query.

The first processor 61 and the second processor 62 are communicatively coupled so as to share data, generally through random-access memory (RAM). The data to be shared may be outputs of tasks (e.g. the output of a task solved by the first processor 61 may be transmitted to the second processor 62), processed multi-sensor data (e.g. the first processor 61 may process multi-sensor data so as to form a smaller data set which is transmitted to the second processor 62 for performing HPC), instructions for the machine and/or data regarding instructions submitted to the machine for logging purposes, etc.

Figure 9A:
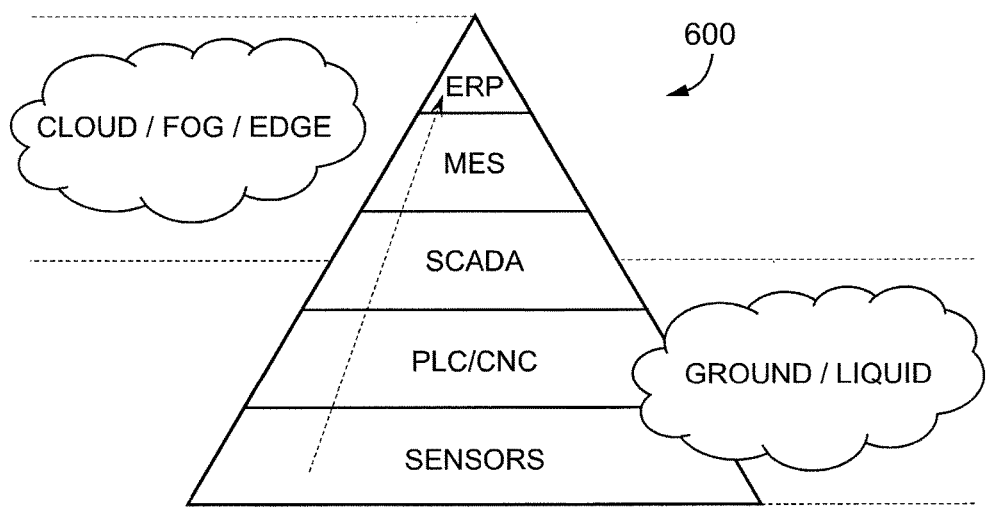
FIG. 9A shows a pyramidal model similar to the one of FIG. 1 but illustrating the paradigm of how data may be processed with a system in accordance with an embodiment of the invention.
Figure 9B:
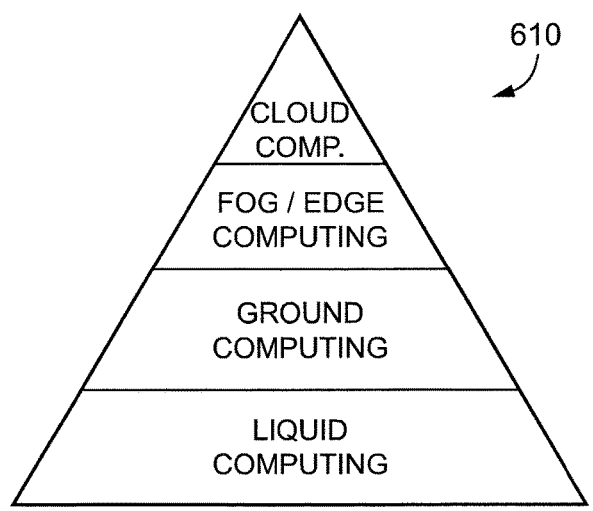
FIG. 9B shows a computational pyramid with liquid computing, ground computing, fog computing and cloud computing.

FIGS. 9A and 9B show pyramidal models 600, 610 illustrating the paradigm of how data are processed with devices and systems in accordance with the invention.

The local computation level confined within the network of the system encompasses the already mentioned ground layer and liquid layer, schematically depicted together in FIG. 9A in relation to the traditional sensors, PLC & SCADA layers of the traditional pyramid 190. The new device and system may reduce the reaction time to any inquiry, necessity or potential/actual malfunction within a system associated with the network. For this reason, the device and system are especially applicable to industrial installations where this aspect is critical. Besides, because data are processed locally within the computing cluster (ground & liquid layers), the amount of data delivered to edge/fog/cloud computing equipment may be reduced. In fact, the data delivered to edge/fog/cloud computing should be mainly reduced to information related to the business/knowledge of the installation. What is more, the devices working as a computing cluster permit to balance their performance in order to optimize the computational capabilities of the computing cluster. Last but not least, the processing/computational capacity of the network increases while new devices are added to the network.

Next, examples are discussed in order to illustrate the advantages of a system in accordance with an embodiment of the invention both in terms of processing time efficiency and reduction of data delivered to fog/cloud computing.

Figure 10:
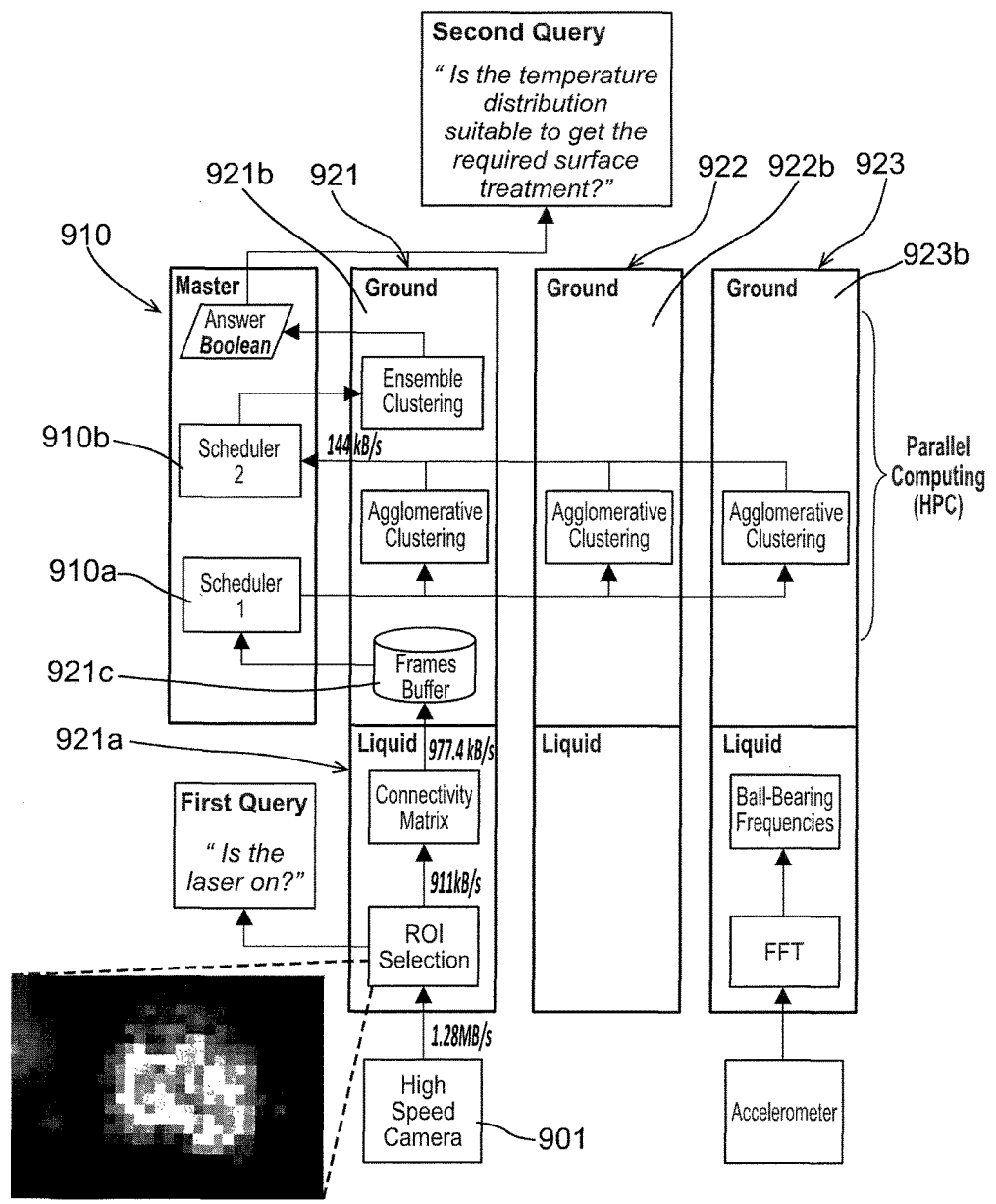
FIG. 10 diagrammatically shows an example of how the system can supervise the operation of a machine of an industrial installation.

An example of control of the operation of a machine of an industrial installation by means of the disclosed system is illustrated in FIG. 10. Three devices 921, 922, 923 of a network formed by a plurality of devices, in addition to the server 910, are shown. To monitor a thermal heat treatment applied by a laser in a machine, a high speed thermographic camera 901 is used. The device 921 gathers data from this camera 901. The camera 901 has a resolution of 1024 pixels per frame, that is to say, the camera encompasses 1024 variables (1 pixel is equivalent to 1 variable). Each variable has a word length of 10 bit. The sample rate is 1000 frames per second (1 kHz). Therefore, this camera produces data at a speed of 1280000 bytes/s (1.28 MB/s, 1.28 megabytes per second).

In relation to the treatment being applied at the machine, it is possible to ask first queries, for example: has the thermal process started? (Or similarly, is the heat source (laser) working?) To solve this query, a task associated with this query and based thereon is created. The computation of this task will provide the answer to the query. In this case, the task to be computed is the obtaining of a region of interest (ROI) and processing it.

Thus, data obtained from the camera 901 at a rate of 1.28 MB/s is sent to the first processor 921a of device 921 where this task is computed by applying a region of interest (ROI) algorithm to eliminate background pixels from each frame image and only work with pixels that contains information. In a particular example, the ROI is a bit larger than 70%: 729 pixels per frame are selected, which corresponds to 911,000 bytes/s (911 Kbytes/s). In FIG. 10, an example of region of interest obtained after applying a ROI algorithm is shown. If the ROI has the appropriate size, then it can be concluded that the thermal process has started (that is to say, the first query is answered). Then, at the first processor 921a, the data coming from the ROI is used to generate a connectivity matrix, in this case, a matrix with dimensions 729×729, which defines for each pixel the neighboring pixels following a given structure of the data. The result of calculating this connectivity matrix provides an output of 66.4 kB/s, which, added to the 911 kB/s, results in 977.4 kB/s as output of the liquid computing (first processor 921a). This connectivity matrix is useful to detect the spatial configuration of pixels. In other words, the result of the ROI is further processed in liquid computing.

Besides, second queries can be formulated. For example: Is the temperature distribution suitable to get the required surface treatment? Or is there any surface at risk of reaching fusion temperature? Or is the temperature distribution constant for each work product? To solve this query, a task associated therewith and based thereon is created. The computation of this task will provide the answer to the query. In this case, the task to be computed is the obtaining of the temperature distribution over the surface. Solving this task implies analyzing the frames captured by the camera 901 at a rate of 1000 frames/s.

In order to perform this processing, the ROI and connectivity matrix are sent to the temporal memory buffer 921c of the second processor 921b of the device 921 in which the first task has been computed. The data stored in the buffer 921c is sent to the server 910. Then, the task is divided into threads by the server 910 (at scheduler 910a) to be sent to different second processors 921b, 922b, 923b of corresponding devices 921 922 923. In particular, each thread runs an algorithm for processing the data associated with a different image frame. Each thread may be running an agglomerative clustering algorithm on pixels of an image frame with the obtained ROI and with common characteristics in terms of time and space (spatio-temporal) resulting from the connectivity matrix. The server 910 assigns threads to several devices 921, 922, 923, particularly, to the second processors 921b, 922b, 923b thereof. In other words, the task is parallelized in order to be able to cope with the large amount of data from the camera (1000 frames/s). Each second processor 921b, 922b, 923b therefore processes different image frames.

The result of each thread is the median, minimum and maximum temperatures and the standard deviation for each clustered frame. In this particular example, the number of clusters is 9. The output data transmission is 144 kB/s (144000 bytes/s). These data (solution of all threads) is sent to the server (at scheduler 910b) in order to generalize the values along thermal treatment process cycle time. This ensemble is assigned by the server 910 to the second processor 921b of a device 921. The temperature distribution over the surface resulting from the task gives the answer to the second query.

Figure 11:
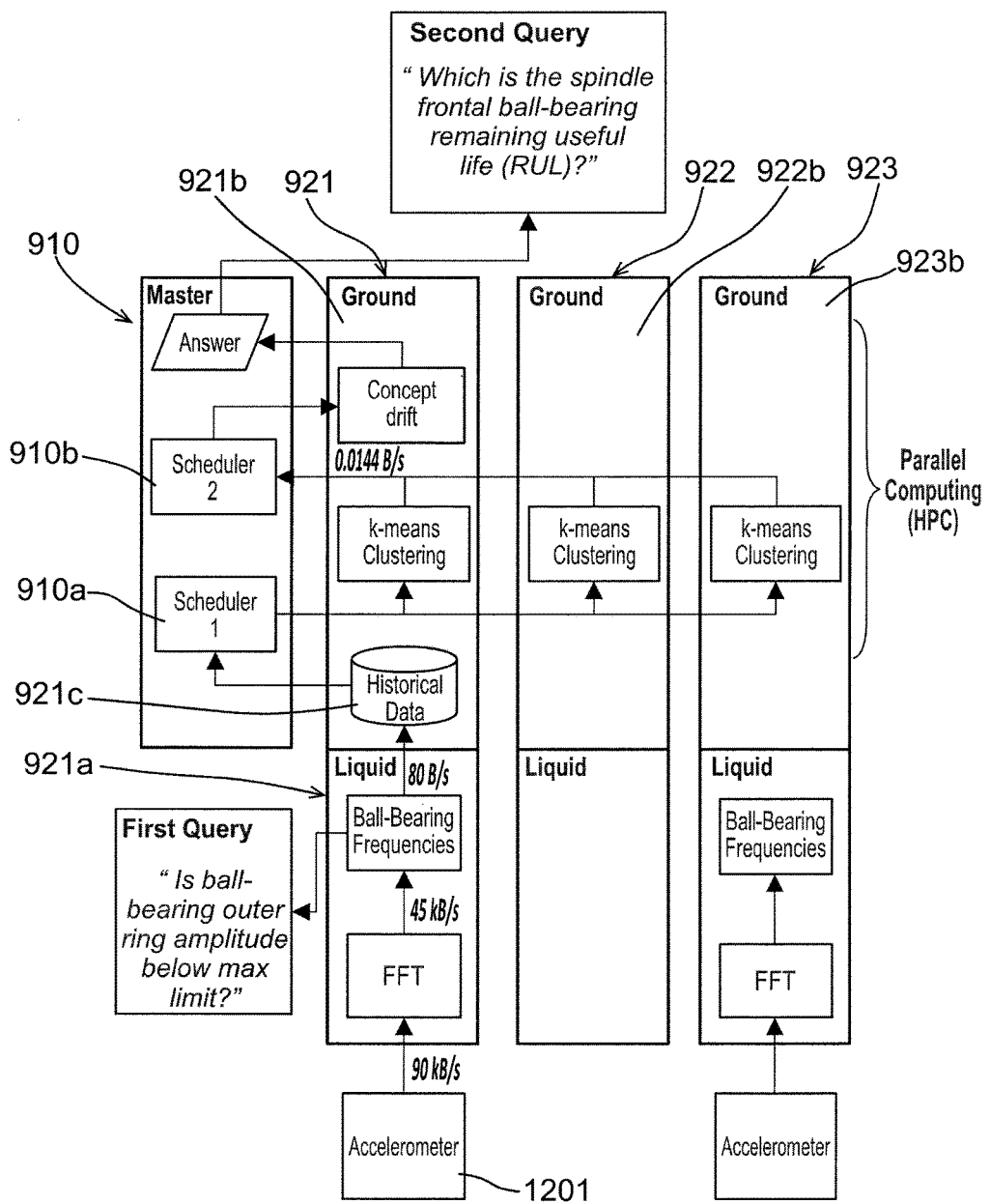
FIG. 11 diagrammatically shows another example of how the system can supervise the operation of a machine of an industrial installation.

Another example of control of the operation of a machine of an industrial installation by means of the disclosed system is illustrated in FIG. 11. Three devices 921, 922, 923 of a network formed by a plurality of devices, in addition to the server 910, are shown. To carry out condition monitoring over a rotating component 130, one accelerometer 1201 is used.

Figure 12:
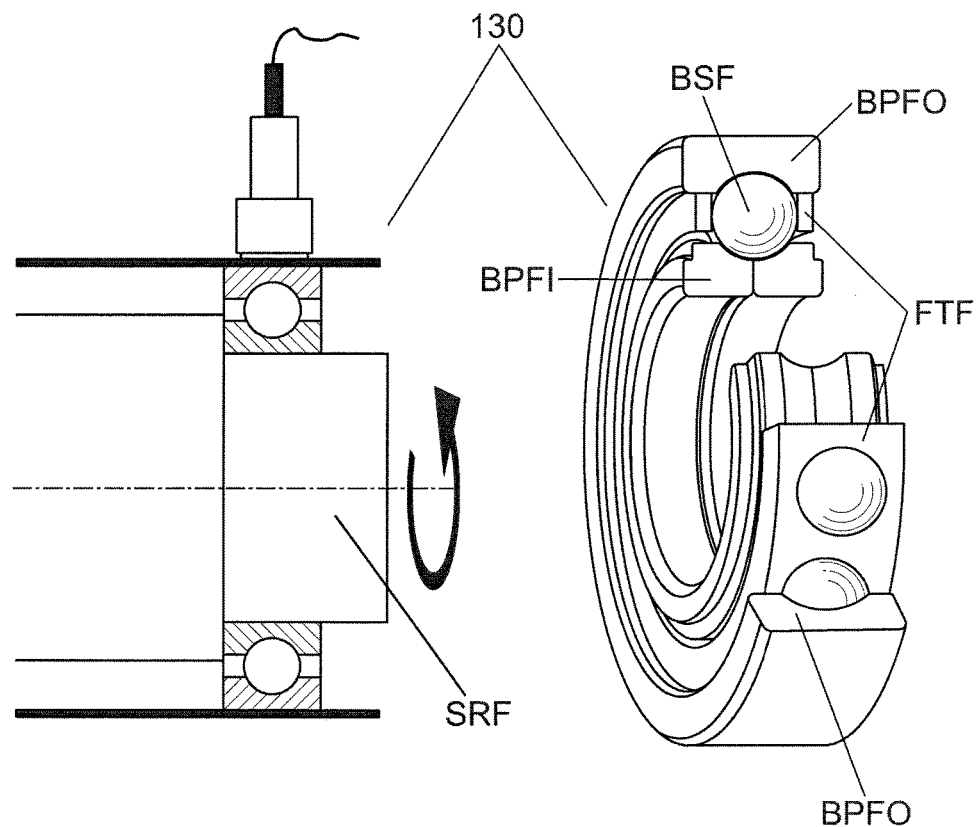
FIG. 12 illustrates a rotating component the operation of which may be supervised with a device and/or a system in accordance with embodiments of the invention.

FIG. 12 shows two views of a rotating component 130 (side view on the left and a sectional view in 3D on the right). The accelerometer 1201 has a word length of 24 bit. The sample rate is 30 kHz to monitor at most 10 kHz phenomena. Therefore, the accelerometer 1201 produces data at a speed of 90 kB/s (90000 bytes/s). From the accelerometer 1201, data is sent to the first processor 921a of device 921 where a fast Fourier transform (FFT) is applied to move from time domain to frequency domain. This transformation reduces the amount of transmitted data by a half, giving 45 kB/s (45000 bytes/s). From the FFT, frequencies of interest from the ball-bearings are selected: fundamental train frequency FTF, ball pass frequency of inner ring BPFI, ball pass frequency of outer ring BPFO, ball spin frequency BSP and shaft rotation frequency SRF, as shown in FIG. 12 (right). With these frequencies it is possible to ask first queries, for example: is the ball pass frequency of inner ring below its maximum limit? Which is the instantaneous acceleration amplitude for the ball spin frequency?

Then, the amplitude for each of the 5 frequencies of interest is sent to the temporal memory buffer 921c of the second processor 921b of the device 921. The 5 frequencies and their corresponding amplitudes imply 10 variables, each of which requires 4 bytes. Because in this example 2 FFT are made per second, the output of the liquid stage provides data at 80 B/s. The data stored in the buffer 921c is sent to the server 910 (at scheduler 910a), that assigns threads to other second processors 921b, 922b, 923b of respective devices 921, 922, 923. In this case, parallelization is not due to a large amount of data to be processed (as was the case of the data gathered by the camera in the example illustrated in FIG. 10); on the contrary, parallelization is required because a k-means clustering algorithm needs to be initialized several times in order to prevent from falling in local minima (because the algorithm is launched from random points that may lead to a local minimum). So, in this case, each thread sent to other second processors comprises running a k-means clustering algorithm to group amplitudes with common characteristics in terms of time. The algorithm is thus initialized several times (once per thread) with the same input data (historical data stored in buffer 921c) in order to later select the best results (most separated centroids). The result of each thread is the centroid (5 variables, one per frequency) and one diameter for each cluster (that is to say, 6 variables). There are 4 bytes/variable. In this particular example, the number of clusters is 3. Therefore, each k-means provides 72 bytes. Because in this example it has been established that 10000 FFT are used for each k-means clustering algorithm and 2 FFT per second are made, and taking into account that each k-means provides 72 bytes, at this stage, the resulting output data transmission is about 0.0144 bytes/s. Parallelizing the execution of each k-means clustering algorithm is necessary because each execution may take several seconds. These data coming from each thread is sent again to the server 910 (at scheduler 910b) in order to run a statistical test to detect if the clusters are evolving (concept drift). The computation of this test is assigned by the server to other second processor 921b. Having the concept drift values (new centroid positions), a task for solving second queries is completed. Examples of such second queries are: which is the component ball-bearing remaining useful life? Is the ball-bearing having abnormal degradation? Does the ball-bearing need to be replaced or serviced?

As can be observed, while the second processor 923b of device 923 is computing the thread according to which a k-means clustering algorithm is executed in order to solve the task associated with a rotating element of the machine to which device 921 is connected, the first processor 923a of device 923 is computing in liquid computing another task for solving a query associated with a rotating element of the machine to which device 923 is connected.

As can be deduced from the former examples, the volume of data obtained at the output of liquid computing (first processor of a device) with respect to the data processed by the first processor (that is to say, with respect to the data at the input of the liquid computing) is reduced. In the first example, a reduction of 1280/977.4 times is approximately obtained. In the second example, a reduction of 90,000/80 times is obtained in liquid computing. Concerning ground computing, in the first example a reduction of 977.4/144 times is obtained, while in the second example a reduction of 80/0.0144 times is obtained. This implies that the volume of data to be provided for further processing in fog/cloud computing is also reduced. In embodiments of the invention, the volume of data provided for further processing in edge/fog/cloud computing is preferably at least 10 times smaller than the volume of data arriving at ground computing, more preferably 20 times smaller, still more preferably 100 times smaller and in some cases it is even up to $10^6$ times smaller. How many times it is smaller depends on the queries being dealt with.

The first, second and third queries as described in the present disclosure may be queries for at least one of the following: supervising operation of at least one machine (or at least one component of a machine) in an industrial installation; predicting the behavior of the at least one machine/component; actuating the at least one machine/component; controlling the devices (with the answer to the queries being used by a device or the server of the network) so as to react to any malfunction that might have been detected or diagnosed; and prescribing any actuation on the machine/component.

In this text, the term "comprises" and "includes" and their derivations (such as "comprising", "including", etc.) should not be understood in an excluding sense, that is, these terms should not be interpreted as excluding the possibility that what is described and defined may include further elements, steps, etc. In this text, the terms "multiplicity" and "plurality" have been interchangeably used.

The invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A system for supervising and controlling one or more industrial application machines having sensors, using a plurality of separate computing devices, the system comprising:
   a server connected for communication with the plurality of devices forming a computing cluster, the server controlling operation of the devices;
   each of the devices having input/output ports for connection to other like devices;
   each of the devices having a data acquisition block with a sensor interface connected to a machine for receiving multi-sensor data from the machine;
   each of the devices having at least one memory;
   each of the devices having a first processor receiving the multi-sensor data and using the data to compute in real-time a first processing task for solving a first query related to the operation of the machine to which the device is connected;
   the server having at least one memory and at least one processor for solving a second query by partitioning into threads a second processing task for solving the second query and assigning the threads to the devices for cooperative computing of the second processing task; and
   each of the devices having a second processor sharing its processing power with the computing cluster, computing at least one thread assigned by the server and sending a solution thereof to the server for solving the second query the second processor locally computing a third processing task comprising processing data obtainable from the server or any device of the plurality of devices to form a data set for solving a third query;

wherein the first processor of each device provides a solution for the first query to the second processor of a same device, and/or derives a first instruction from a solution for the first query and provides the first instruction to the machine it is connected to; and wherein the at least one processor of the server derives a second instruction from a solution for the second query and provides the second instruction to a machine through the device that is connected to said machine.

2. The system of claim 1, wherein the first processing task comprises:
preprocessing the data to form a data set, and selecting a subset of data, from the data set, for solving the first query; or
preprocessing the data to form a data set for solving the first query.

3. The system of claim 1, wherein the at least one processor of the server further receives outputs of the threads from the devices, processes the outputs to compute the second processing task, and provides the solution for the second query.

4. The system of claim 1, wherein each device performs data acquisition, from the machine to which the device is connectable, synchronized with data acquisition performed by the other devices, from the machine each of the other devices is connectable to.

5. The system of claim 1, further comprising a networking device for transmitting data within the network to a computing device external to the network, the computing device preferably performing fog computing or cloud computing.

6. The system of claim 1, wherein the at least one processor of the server runs a first instruction set architecture different from a second instruction set architecture run by the second processor of each device of the plurality of devices; and the server further comprises a network interface connectable to a device of the plurality of devices, the network interface converting instructions from the first instruction set architecture to the second instruction set architecture and vice versa.

7. A system for supervising and controlling one or more industrial application machines having sensors, using a plurality of separate computing devices, the system comprising:
a server connected for communication with the plurality of devices forming a computing cluster, the server controlling operation of the devices;
each of the devices having input/output ports for connection to other like devices;
each of the devices having a data acquisition block with a sensor interface connected to a machine for receiving multi-sensor data from the machine;
each of the devices having at least one memory;
each of the devices having a first processor receiving the multi-sensor data and using the data to compute in real-time a first processing task for solving a first query related to the operation of the machine to which the device is connected;

the server having at least one memory and at least one processor for solving a second query by partitioning into threads a second processing task for solving the second query and assigning the threads to some devices of the plurality of devices for cooperative computing of the second processing task; and each of the devices having a second processor sharing its processing power with the computing cluster, computing at least one thread assigned by the server and sending a solution thereof to the server for solving the second query, the second processor locally computing a third processing task for solving a third query, comprising processing data obtainable from the server or any device of the plurality of devices to form a data set for solving the third query;

wherein the first processor of each device derives a first instruction from a solution for the first query and provides the first instruction to the machine it is connected to; and wherein the at least one processor of the server derives a second instruction from a solution for the second query and provides the second instruction to a machine through the device that is connected to said machine.

8. The system of claim 7, wherein the first processing task comprises:
preprocessing the data to form a data set, and selecting a subset of data, from the data set, for solving the first query; or
preprocessing the data to form a data set for solving the first query.

9. The system of claim 7, wherein the at least one processor of the server further receives outputs of the one or more threads from the devices, processes the outputs to compute the second processing task, and provides a solution for the second query.

10. The system of claim 7, wherein each device performs data acquisition, from the machine to which the device is connectable, synchronized with data acquisition performed by the other devices, from the machine each of the other devices is connectable to.

11. The system of claim 7, further comprising a networking device for transmitting data within the network to a computing device external to the network, the computing device preferably performing fog computing or cloud computing.

12. The system of claim 7, wherein the at least one processor of the server runs a first instruction set architecture different from a second instruction set architecture run by the second processor of each device of the plurality of devices; and the server further comprises a network interface connectable to a device of the plurality of devices, the network interface converting instructions from the first instruction set architecture to the second instruction set architecture and vice versa.

\* \* \* \* \*